United States Patent
Jiang et al.

(10) Patent No.: US 12,470,764 B2
(45) Date of Patent: Nov. 11, 2025

(54) WIRELESS PROJECTION METHOD, SOURCE END DEVICE, AND DESTINATION END DEVICE

(71) Applicant: HUAWEI TECHNOLOGIES CO., LTD., Guangdong (CN)

(72) Inventors: Xiaohua Jiang, Shenzhen (CN); Zhijun Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 18/333,830

(22) Filed: Jun. 13, 2023

(65) Prior Publication Data

US 2023/0328306 A1 Oct. 12, 2023

Related U.S. Application Data

(63) Continuation of application No. PCT/CN2020/136221, filed on Dec. 14, 2020.

(51) Int. Cl.
*H04N 21/43* (2011.01)
(52) U.S. Cl.
CPC .............................. *H04N 21/4302* (2013.01)
(58) Field of Classification Search
CPC .......... G06F 3/1454; G09G 5/12; H04N 5/04; H04N 21/4122; H04N 21/4302; H04N 21/43076; H04N 21/436
See application file for complete search history.

(56) References Cited

U.S. PATENT DOCUMENTS

| | | | | |
|---|---|---|---|---|
| 8,064,389 B2* | 11/2011 | Khan | ...................... | H04B 7/022 375/240 |
| 8,072,943 B2* | 12/2011 | Khan | ...................... | H04L 1/0625 370/335 |
| 8,824,304 B2* | 9/2014 | Vulkan | ................... | H04L 65/80 370/252 |
| 10,356,449 B2* | 7/2019 | Moon | ..................... | H04H 60/07 |
| 10,499,278 B2* | 12/2019 | Anchan | ................... | H04L 65/70 |
| 2007/0165104 A1* | 7/2007 | Khan | ..................... | H04N 20/30 348/14.02 |
| 2007/0165566 A1* | 7/2007 | Khan | ..................... | H04L 1/0606 370/329 |

(Continued)

FOREIGN PATENT DOCUMENTS

GB 2575805 A 1/2020

*Primary Examiner* — Michael B. Pierorazio
(74) *Attorney, Agent, or Firm* — Rimon PC

(57) ABSTRACT

Embodiments of this application disclose a wireless projection method. The method includes receiving a first bitstream from a source end device, where the first bitstream is obtained by encoding first video data. The method also includes obtaining first time information of the first bitstream, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream. The method also includes adjusting a display vertical synchronization (Vsync) signal of the destination end device based on the first time information.

16 Claims, 18 Drawing Sheets

(56) References Cited

U.S. PATENT DOCUMENTS

| | | | |
|---|---|---|---|
| 2008/0170630 A1* | 7/2008 | Falik | H04L 47/26 375/E7.193 |
| 2009/0022221 A1* | 1/2009 | Xie | H04N 19/187 375/E7.03 |
| 2009/0074082 A1* | 3/2009 | Xiong | H04N 19/61 375/E7.2 |
| 2009/0168680 A1* | 7/2009 | Singh | H04L 12/189 370/312 |
| 2009/0295905 A1* | 12/2009 | Civanlar | H04L 45/22 348/14.09 |
| 2010/0118760 A1* | 5/2010 | Xie | H04N 21/2368 370/312 |
| 2010/0172278 A1* | 7/2010 | Nishio | H04W 52/42 370/312 |
| 2010/0172286 A1* | 7/2010 | Yoshii | H04J 11/005 370/328 |
| 2012/0198501 A1* | 8/2012 | Ruan | H04H 20/30 725/62 |
| 2014/0269933 A1* | 9/2014 | Tourapis | H04N 5/04 348/500 |
| 2017/0188092 A1* | 6/2017 | Lawrence | H04N 21/43615 |
| 2017/0359607 A1* | 12/2017 | Li | H04N 21/4331 |
| 2020/0177947 A1 | 6/2020 | Hui et al. | |
| 2021/0093966 A1* | 4/2021 | Cerny | A63F 13/355 |

\* cited by examiner

S1401: Send a first bitstream to a destination end device, where the first bitstream is obtained by encoding first video data S1402: Adjust a display vertical synchronization Vsync signal of a source end device based on first time information, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream

FIG. 14

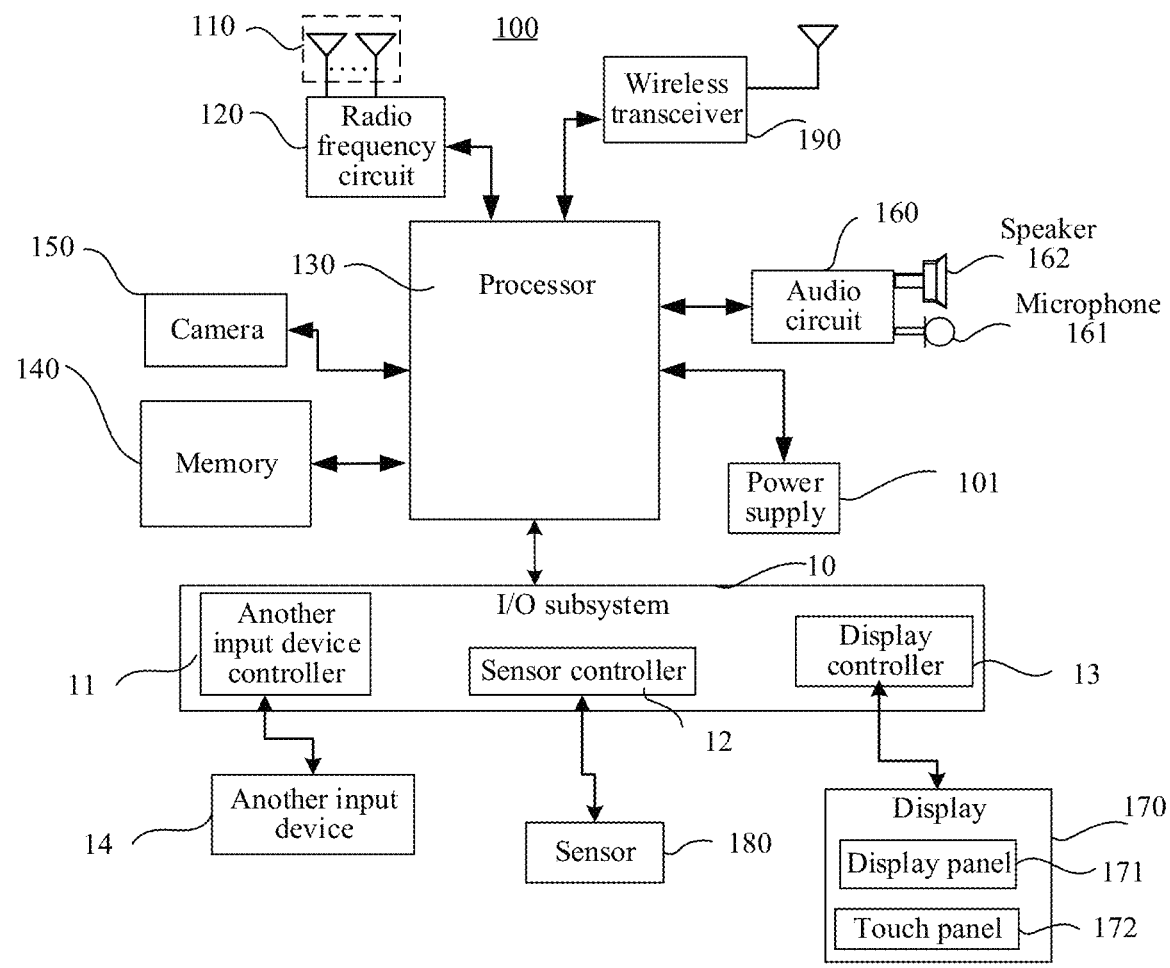

FIG. 15

WIRELESS PROJECTION METHOD, SOURCE END DEVICE, AND DESTINATION END DEVICE

CROSS-REFERENCE TO RELATED APPLICATIONS

This application is a continuation of International Application No. PCT/CN2020/136221, filed on Dec. 14, 2020, the disclosure of which is hereby incorporated by reference in its entirety.

TECHNICAL FIELD

This application generally relates to the multimedia field, and in particular, to a wireless projection method, a source end device, and a destination end device.

BACKGROUND

Wireless projection is a technology in which a media file of a source end device is sent to a destination end device through a wireless transmission, and is then displayed by the destination end device. The media file may be a video, a specified display picture, and the like. Applications of wireless projection include but are not limited to game projection, a virtual reality (VR) helmet, and VR glasses, which require wireless projection feature data interaction. Therefore, an end-to-end delay of wireless projections need to be as low as possible. If the end-to-end delay is excessively large, performance and user experience of a wireless projection product is severely affected.

However, when the media file of the source end device is displayed on a display device by using the wireless projection technology, there is an end-to-end delay that may be caused by a plurality of processes. Some of these processes include encoding of the source end device, sending of the source end device, transmission through a wireless transmission channel, receiving of the destination end device, and decoding of the destination end device. In addition, because the source end device and the destination end device have respective display vertical synchronization (e.g., Vertical Sync, Vsync) signals, and the Vsync signals of the two devices are not synchronized (for example, the Vsync signals of the two devices have a random phase relationship), the destination end device cannot display the media file immediately after completing decoding, and can only display the media fila only after the Vsync signal of the destination end device arrives. This further increases the end-to-end delay of wireless projection.

How to reduce the end-to-end delay of wireless projection as much as possible needs to be urgently resolved.

SUMMARY

Embodiments of this application provide a wireless projection method, a destination end device, and a source end device, to reduce an end-to-end delay generated in a wireless projection process and improve user experience.

A first aspect of embodiments of this application provides a wireless projection method. The method includes: receiving a first bitstream from a source end device, where the first bitstream is obtained by encoding first video data; obtaining first time information of the first bitstream, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream; and adjusting a display vertical synchronization (Vsync) signal of the destination end device based on the first time information.

In some embodiments, the destination end device gradually adjusts the display Vsync signal of the destination end device by obtaining time information of the source device or by obtaining determined time points (for example, a time point at which the destination end device starts receiving a bitstream, a time point at which the destination end device receives the bitstream, a time point at which decoding starts (where the time point at which decoding starts may be approximately equal to the time point at which the destination end device receives the bitstream), or a time point at which decoding is completed), that can be obtained by the destination end device, so that the display Vsync signals of the source end device and the destination end device are synchronized. This approach may reduce a display waiting delay caused by asynchronization of the display Vsync signals of the source end device and the destination end device.

In a possible implementation, the first time information indicates the first time point at which the source end device starts encoding the first bitstream, where the obtaining first time information of the first bitstream includes: extracting the first time point from the first bitstream; and the adjusting of the display Vsync signal of the destination end device based on the first time information includes: obtaining a first reference delay, where the first reference delay is a reference delay between the first time point and a time point at which the destination end device completes decoding the first bitstream; obtaining a first time interval, where the first time interval is a delay between the first time point and a time point at which the destination end device starts displaying the first video data; and adjusting the display Vsync signal of the destination end device until a difference between the first reference delay and the first time interval is less than a first preset threshold.

It should be understood that an end-to-end delay generated when a video stream of the source end device is transmitted to the destination end device for display includes: an encoding delay T1 and a sending delay T2 generated on a source end device side, a transmission delay T3 generated on a wireless transmission channel, and a receiving delay T4, a decoding delay T5, and a display waiting delay T6 that are generated on a destination end device side. The sending delay T2 is time occupied by the source end device to pack a bitstream obtained through encoding into a data packet compliant with a transmission protocol and send the data packet to a communication processor. For example, the communication processor is a wireless fidelity (Wi-Fi) chip. The receiving delay T4 is time occupied by the destination end device to receive the data packet and parse the data packet to obtain the bitstream. The display waiting delay T6 is caused by phase asynchronization between the display Vsync signals of the source end device and the destination end device.

In some embodiments, the destination end device may obtain the time information at the source end device side. Further, a time in which the destination end device receives the bitstream and a time required for decoding may be obtained. In this way, the first reference delay (equivalent to a reference value of T1+T2+T3+T4+T5) from the time point at which the source end device starts encoding to the time point at which the destination end device completes decoding may be obtained, and the time point at which the destination end device starts displaying may also be obtained. Therefore, the first time interval (where the first time interval is equivalent to T1+T2+T3+T4+T5+T6 in a display process) from the time point at which the source end device starts encoding to the time point at which the destination end device performs the display may be obtained. If the Vsync signal of the destination end device is adjusted so that the first time interval is equal to the first reference delay, it may be considered to be equivalent to describing that the display waiting delay T6 is eliminated.

In a possible implementation, the first reference delay is an empirical value, or the first reference delay is obtained based on sample statistics.

It should be understood that the empirical value may be obtained based on a large quantity of experiments in advance, and is considered by the source end device and the destination end device in advance.

In a possible implementation, the obtaining of the first reference delay includes: S1: obtaining the first time point TStart carried in the first bitstream; S2: recording a time point TReceive at which the first bitstream is received; S3: obtaining a decoding delay T5 from a destination end decoder; S4: calculating a sample value TDelaytmp=TReceive−TStart+T5 of the first reference delay; performing S1 to S4 cyclically until a quantity of sample values of the first reference delay reaches a sample threshold; and determining the first reference delay TDelay1 from the plurality of sample values.

It should be understood that the time point at which the first bitstream is received may be approximately equal to the time point at which the first bitstream starts to be decoded. That is, TReceive may be approximately equal to the third time point at which the destination end device starts to decode the first bitstream.

It should be understood that, as a quantity of times of cycles increases, obtained sample values of the first reference delay gradually converge. Therefore, to obtain the first reference delay that can accurately reflect a delay situation, the quantity of sample values of the first reference delay needs to be as large as possible.

In a possible implementation, a largest value of the plurality of sample values of the first reference delay is used as TDelay1; or a median value of the plurality of sample values is used as TDelay1; or the plurality of sample values of the first reference delay are sorted in descending order, and a (sample value quantity×X %)$^{th}$ sample value from the beginning is used as TDelay1.

It should be understood that, some extreme cases in which the first reference delay is excessively long due to an extreme environment of disturbance or extremely poor network may be excluded by flexibly setting X, and that most cases are met at a far higher rate, for example, 90% to 99% cases are met. Therefore, a value of X is generally small, so that the obtained sample value is a large value in the plurality of sample values. It is clear that the plurality of sample values of the first reference delay may alternatively be sorted in ascending order, and then a later sample value is used as TDelay1. It should be understood that, as the quantity of sample values of the first reference delay increases, TDelay1 gradually converges to a fixed value.

In a possible implementation, the obtaining of the first time interval specifically: obtaining the first time point carried in the first bitstream; generating an interrupt when a Vsync valid signal for starting display arrives; and recording a fifth time point at which the destination end device starts to display the first video data, where a difference between the fifth time point and the first time point is the first time interval.

In a possible implementation, the adjusting of the display Vsync signal of the destination end device until a difference between the first reference delay and the first time interval is less than a first preset threshold includes: when the first time interval is greater than the first reference delay, moving a phase of the display Vsync signal of the destination end device forward by one time step, where the time step is a smallest time unit by which a clock of the destination end device can be adjusted; when the first time interval is less than the first reference delay, moving a phase of the display Vsync signal of the destination end device backward by one time step; or when the difference between the first reference delay and the first time interval is less than the first preset threshold, stopping adjusting the display Vsync signal of the destination end device.

That the phase of the Vsync signal is moved forward may be understood as that a time point of generating the Vsync valid signal is moved toward a direction closes to an origin of a time axis, and that the phase of the Vsync signal is moved backward may be understood as that the time point of generating the Vsync valid signal is moved towards a direction away from the origin of the time axis. After each adjustment, the destination end device displays a latest received video frame based on the adjusted Vsync signal. When the difference between the first reference delay and the first time interval is greater than the first preset threshold, the first time interval is repeatedly obtained, and the phase of the Vsync signal of the destination end device is adjusted step by step. When the first reference delay is equal to the first time interval, it is equivalent to describing that the display waiting delay is completely eliminated. In this case, it is considered that a phase of the Vsync signal of the source end device and the phase of the Vsync signal of the destination end device are synchronized. However, in an actual case, the first reference delay may not be completely equal to the first time interval. Alternatively, when the difference between the first reference delay and the first time interval is less than the first preset threshold, or the difference between the first reference delay and the first time interval is fixed within a specific difference interval, it may be considered that the phase of the Vsync signal of the source end device and the phase of the Vsync signal of the destination end device are basically synchronized.

In a possible implementation, the first time information indicates the second time point at which the destination end device starts receiving the first bitstream; the obtaining first time information of the first bitstream includes: recording the second time point at which the receiving of the first bitstream starts; and the adjusting a display Vsync signal of the destination end device based on the first time information includes: obtaining a second reference delay, where the second reference delay is a reference delay between the second time point and a time point at which the destination end device completes decoding; obtaining a second time interval, where the second time interval is a delay between the second time point and a time point at which the destination end device starts displaying the first video data; and adjusting the display Vsync signal of the destination end device until a difference between the second reference delay and the second time interval is less than a second preset threshold.

In some embodiments, the destination end device records the second time point at which the receiving of the first bitstream starts and the time point at which the destination end device completes decoding. In this way, the second reference delay from the time point at which the destination end device starts receiving the bitstream to the time point at which the destination end device completes decoding can be obtained. The second reference delay is equivalent to a reference value of T4+T5, or the second reference delay may represent an empirical value of T4+T5 in most cases. Further, the destination end device obtains the time point at which display starts. In this way, the second time interval from the time point at which the destination end device starts receiving the first bitstream to the time point at which the destination end device starts displaying the first bitstream can be obtained. The second time interval is equivalent to a total delay T4+T5+T6 generated by the destination end device for displaying the first bitstream. If the Vsync signal of the destination end device is adjusted so that the second time interval is equal to the second reference delay, it may be considered to be equivalent to describing that the display waiting delay T6 is eliminated.

In a possible implementation, the adjusting of the display Vsync signal of the destination end device until a difference between the second reference delay and the second time interval is less than a second preset threshold includes: when the second time interval is greater than the second reference delay, moving a phase of the display Vsync signal of the destination end device forward by one time step, where the time step is a smallest time unit by which a clock of the destination end device can be adjusted; when the second time interval is less than the second reference delay, moving a phase of the display Vsync signal of the destination end device backward by one time step; or when the difference between the second reference delay and the second time interval is less than the second preset threshold, stopping adjusting the display Vsync signal of the destination end device.

It should be understood that, when the difference between the second reference delay and the second time interval is greater than the second preset threshold, the second time interval for displaying a next bitstream is repeatedly obtained, the second time interval is repeatedly compared with the second reference delay, and the display Vsync signal of the destination end device is adjusted by one time step each time the second time interval is compared with the second reference delay.

In a possible implementation, the first time information indicates the third time point at which the destination end device starts decoding the first bitstream; the obtaining first time information of the first bitstream includes: obtaining the third time point from a decoder side of the destination end device; and the adjusting a display Vsync signal of the destination end device based on the first time information includes: obtaining a third reference delay, where the third reference delay is a reference delay between the third time point and a time point at which the destination end device completes decoding the first bitstream; obtaining a third time interval, where the third time interval is a delay between the third time point and a time point at which the destination end device starts displaying the first video data; and adjusting the display Vsync signal of the destination end device until a difference between the third reference delay and the third time interval is less than a third preset threshold.

In some embodiments, the destination end device records the third time point (where the third time point is approximately equal to a time point at which the destination end device receives the first bitstream) at which decoding of the first bitstream starts and a time point at which decoding of the first bitstream is completed, to obtain a reference delay from the time point at which the destination end device starts decoding the first bitstream to the time point at which decoding of the first bitstream is completed. The reference delay is the decoding delay T5 generated by the destination end device for decoding the first bitstream, that is, the third reference delay is equivalent to a reference value of T5, or the third reference delay may represent an empirical value of T5 in most cases. Further, the destination end device obtains the time point at which display starts. In this way, the third time interval from the time point at which the destination end device starts decoding the first bitstream to the time point at which the destination end device starts displaying the first bitstream can be obtained. The third time interval is equivalent to a sum of the decoding delay and the display waiting delay T5+T6. If the Vsync signal of the destination end device is adjusted so that the third time interval is equal to the third reference delay, it is equivalent to describing that the display waiting delay T6 is eliminated. This reduces an end-to-end delay from the start of the encoding by the source end device to the start of the displaying by the destination end device.

In a possible implementation, the destination end device may directly obtain the decoding delay T5 from the decoder, and does not need to record the time point at which decoding of the first bitstream starts and the time point at which decoding of the first bitstream is completed.

In a possible implementation, the third reference delay is an empirical value, or the third reference delay is obtained based on sample statistics.

In a possible implementation, a plurality of time points of decoding are repeatedly obtained to obtain a plurality of sample values of T5. The plurality of sample values are sorted in descending order, and a (sample value quantity×X %)$^{th}$ T5 from the beginning is used as the third reference delay TDelay3; or the plurality of sample values are sorted in ascending order, and a (sample value quantity×X %)$^{th}$ T5 from the end is used as the third reference delay TDelay3. It should be understood that as a quantity of obtained sample values increases, the third reference delay TDelay3 gradually converges to a fixed value. Therefore, to obtain the third reference delay that can accurately reflect a delay situation, the quantity of sample values of the third reference delay needs to be as large as possible.

In a possible implementation, the adjusting the display Vsync signal of the destination end device until a difference between the third reference delay and the third time interval is less than a third preset threshold includes: when the third time interval is greater than the third reference delay, moving a phase of the display Vsync signal of the destination end device forward by one time step, where the time step is a smallest time unit by which a clock of the destination end device can be adjusted; when the third time interval is less than the third reference delay, moving a phase of the display Vsync signal of the destination end device backward by one time step; or when the difference between the third reference delay and the third time interval is less than the third preset threshold, stopping adjusting the display Vsync signal of the destination end device.

It should be understood that, when the difference between the third reference delay and the third time interval is greater than the third preset threshold, the third time interval for displaying a next bitstream is repeatedly obtained, the third time interval is repeatedly compared with the third reference delay, and the display Vsync signal of the destination end device is adjusted by one time step each time the third time interval is compared with the third reference delay. Theoretically, when the third reference delay is equal to the third time interval, it is considered to be equivalent to describing that the display waiting delay T6 is completely eliminated. In this case, it is considered that the phase of the Vsync signal of the source end device and the phase of the Vsync signal of the destination end device are synchronized. However, in an actual case, the third reference delay may not be completely equal to the third time interval. Alternatively, when the difference between the third reference delay and the third time interval is less than the third preset threshold, or the difference between the third reference delay and the third time interval is fixed within a specific difference interval, it may be considered that the phase of the Vsync signal of the source end device and the phase of the Vsync signal of the destination end device are basically synchronized.

In a possible implementation, the first time information indicates the fourth time point at which the destination end device completes decoding the first bitstream; the obtaining first time information of the first bitstream includes: obtaining the fourth time point from a decoder side of the destination end device; and the adjusting a display of the Vsync signal of the destination end device based on the first time information includes: obtaining a fourth reference delay, where the fourth reference delay is a reference delay between the fourth time point and a time point at which the destination end device starts displaying the first video data; and adjusting the display Vsync signal of the destination end device until the fourth reference delay is less than a fourth preset threshold.

In some embodiments, the fourth time point at which the destination end device completes decoding the first bitstream, and the time point at which the destination end device starts displaying the first bitstream are recorded. A reference delay between the fourth time point at which the destination end device completes decoding the first bitstream and the time point at which the destination end device starts displaying the first bitstream is the display waiting delay T6. In other words, the fourth reference delay is equivalent to a reference value of T6, or the fourth reference delay may represent an empirical value of T6 in most cases. If the Vsync signal of the destination end device is adjusted, so that the fourth reference delay is equal to 0, it is equivalent to describing that the display waiting delay T6 is completely eliminated. This reduces the end-to-end delay from the start of the encoding by the source end device to the start of the displaying by the destination end device. However, in an actual case, the fourth reference delay may not be equal to 0. Alternatively, when the fourth reference delay is less than the fourth preset threshold, or the fourth reference delay is fixed within a specific delay interval, it may be considered that the phase of the Vsync signal of the source end device and the phase of the Vsync signal of the destination end device are basically synchronized.

In a possible implementation, the obtaining of the fourth reference delay includes: S1: determining a corresponding time point Tdec at which the destination end device completes decoding; S2: determining a corresponding time point TDisplay at which the destination end device starts displaying; S3: calculating, based on Tdec and TDisplay, a sample value TDelay4Tmp=TDisplay−Tdec of the fourth reference delay TDelay4 from the completion of the decoding to the start of the displaying by the destination end device; S4: determining whether a quantity of sample values of the fourth reference delay reaches a sample threshold; if the quantity of sample values of the fourth reference delay does not reach the sample threshold, performing S1; or if the quantity of sample values of the fourth reference delay reaches the sample threshold, performing S5; and S5: determining the fourth reference delay TDelay4 from the plurality of sample values.

In a possible implementation, the plurality of sample values are sorted in descending order, and a (sample value quantity×X %)$^{th}$ sample value from the beginning is used as the fourth reference delay TDelay4; or the plurality of sample values are sorted in ascending order, and a (sample value quantity×X %)$^{th}$ sample value from the end is used as the fourth reference delay TDelay4. It should be understood that, as the quantity of sample values increases, the fourth reference delay TDelay4 gradually converges to a fixed value.

In a possible implementation, the adjusting of the display Vsync signal of the destination end device until the fourth reference delay is less than a fourth preset threshold includes: when the fourth reference delay is less than TFrame/2, moving a phase of the display Vsync signal of the destination end device forward by one time step, where the time step is a smallest time unit by which a clock of the destination end device can be adjusted, and TFrame is a time interval between two adjacent frames displayed by the destination end device; when the fourth reference delay is greater than TFrame/2, moving a phase of the display Vsync signal of the destination end device backward by one time step; or when the fourth reference delay is less than the fourth preset threshold, stopping the adjustment of the display Vsync signal of the destination end device.

It should be understood that, TFrame is a time interval between displaying two adjacent frames. For example, when a display frame rate is 60 Hz, TFrame=1/60*1000 ms. When TDelay4 is less than TFrame/2, it indicates that when the phase of the Vsync signal of the destination end device is moved forward, TDelay4 can approach 0 as soon as possible; or when TDelay4 is greater than TFrame/2, it indicates that when the phase of the Vsync signal of the destination end device is moved backward, TDelay4 can approach 0 as soon as possible.

In a possible implementation, TDelay4 is compared with 0. If TDelay4 is greater than 0, the phase of the Vsync signal of the destination end device is adjusted, and the phase of the Vsync signal may be moved forward, or the phase of the Vsync signal may be moved backward. Whether to end the adjustment is determined depending on whether TDelay4 is close to 0. For example, whether TDelay4 is close to 0 may be determined depending on whether a difference between TDelay4 and 0 is less than the fourth preset threshold. When the difference between TDelay4 and 0 is less than the fourth preset threshold, it is determined that TDelay4 is close to 0.

In some embodiments, the fourth reference delay between the time point at which decoding is completed and the time point at which display is started is obtained by using a phase convergence method. The display Vsync signal of the destination end device is adjusted step by step, and the fourth reference delay is gradually adjusted to 0 or infinitely close to 0, so that phases of the Vsync signals of the source end device and the destination end device are basically synchronized. In this way, the display waiting delay T6 is eliminated, and the end-to-end delay from starting encoding by the source end device to starting displaying by the destination end device is reduced.

In a possible implementation, after the receiving a first bitstream from a source end device, the method further includes: decoding the first bitstream to obtain a first row of image data, where the first row of image data is a row of the first video data; when decoding the first bitstream data to obtain a second row of image data, sending the first row of image data to a display for display, where the first time information indicates the third time point at which the destination end device starts decoding the first bitstream; and the adjusting of the display Vsync signal of the destination end device based on the first time information includes: obtaining a fifth reference delay, where the fifth reference delay is a reference delay between the third time point and a time point at which the destination end device starts displaying the first row of image data; and adjusting the display Vsync signal of the destination end device until the fifth reference delay is less than a fifth preset threshold.

In some embodiments, when a row of images is obtained through decoding, the row of images is sent to a display module for display, and there isn't a need to wait until a frame of an image is completely decoded, that is, decoding and displaying are performed in parallel. The fifth reference delay is a delay between the time point at which the destination end device starts decoding and a time point at which the destination end device starts displaying the first row of image data. In other words, the fifth reference delay is equivalent to a reference value of T5+T6, or the fifth reference delay may represent an empirical value of T5+T6 in most cases. In some embodiments, the fifth reference delay from the time point at which the destination end device starts decoding to the time point at which the destination end device starts displaying is obtained by using a phase convergence method. The display Vsync signal of the destination end device is adjusted step by step, and the fifth reference delay is gradually adjusted to 0 or infinitely close to 0, so that display can be performed after decoding starts. In this way, the decoding delay T5 and the display waiting delay T6 are basically eliminated, the end-to-end delay generated in the wireless projection process is reduced to T1+T2+T3+T4, and the end-to-end delay from starting the encoding by the source end device to starting the displaying by the destination end device is reduced. It should be understood that, because only data that is successfully decoded can be displayed, time needed by the decoder to decode the first row of data cannot be eliminated.

In a possible implementation, the first video data is a first slice in a frame of video data, and after the receiving a first bitstream from a source end device, the method further includes: decoding the first bitstream; when decoding the first bitstream, receiving a second bitstream from the source end device, where the second bitstream is obtained through encoding second video data, the second video data is a second slice in the frame of video data, and the second slice is adjacent to the first slice; decoding the first bitstream to obtain a first row of image data of the first slice; when decoding the first bitstream data to obtain a second row of image data of the first slice, sending the first row of image data of the first slice to a display for display; decoding the second bitstream to obtain a first row of image data of the second slice; and when decoding the first bitstream data to obtain a second row of image data of the second slice, sending the first row of image data of the second slice to the display for display.

In a possible implementation, the first time information indicates the third time point at which the destination end device starts decoding the first bitstream; and the adjusting of the display Vsync signal of the destination end device based on the first time information includes: obtaining a sixth reference delay, where the sixth reference delay is a reference delay between the third time point and a time point at which the destination end device starts displaying the first row of image data of the first slice; and adjusting the display Vsync signal of the destination end device until the sixth reference delay is less than a sixth preset threshold.

In some embodiments, a frame of an image is divided into a plurality of slices, and the plurality of slices are processed in parallel. The 2nd slice does not need to be processed after encoding, sending, transmission, receiving, decoding, and display of the 1st slice are all completed. Further, the decoding and display of each slice are in parallel, that is, for each slice, a row of data is sent for display after decoding of the row of data is completed, and does not need to be sent for display after the data of the entire slice is decoded. By adjusting the phase of the display Vsync signal of the destination end device, the end-to-end delay generated in the wireless projection process can be reduced to T11+T12+T13+T14, where T11 is an encoding delay generated when the 1st slice is encoded, T12 is a sending delay generated when the 1st slice is sent, T13 is a transmission delay generated when the 1st slice is transmitted, and T14 is a receiving delay generated when the 1st slice is received. It can be learned that the end-to-end delay depends on a size of the 1st slice. On a premise that the size of the slice meets a specification in the standard, the size of the slice should be as small as possible.

A second aspect of this application provides a wireless projection method. The method includes: sending a first bitstream to a destination end device, where the first bitstream is obtained by encoding first video data; and adjusting a display Vsync signal of a source end device based on first time information, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream.

In some embodiments, phase synchronization between the Vsync signal of the source end device and a Vsync signal of the destination end device is implemented through adjustment of the Vsync signal of the source end device. It should be understood that beneficial effects corresponding to the second aspect and the possible implementations of the second aspect are similar to those corresponding to the first aspect, and details are not described herein again.

In a possible implementation, the first time information indicates the first time point at which the source end device starts encoding the first bitstream; the method further includes: recording the first time point at which encoding of the first bitstream starts; and the adjusting of the display Vsync signal of the source end device based on the first time information includes: obtaining a first reference delay, where the first reference delay is a reference delay between the first time point and a time point at which the destination end device completes decoding the first bitstream; obtaining a first time interval, where the first time interval is a delay between the first time point and a time point at which the destination end device starts displaying the first video data; and adjusting the display Vsync signal of the source end device until a difference between the first reference delay and the first time interval is less than a first preset threshold.

In a possible implementation, the first reference delay is received from the destination end device, or the first reference delay is obtained by the source end device through calculation.

In a possible implementation, the adjusting of the display Vsync signal of the source end device until a difference between the first reference delay and the first time interval is less than a first preset threshold includes: when the first time interval is greater than the first reference delay, moving a phase of the display Vsync signal of the source end device backward by one time step, where the time step is a smallest time unit by which a clock of the source end device can be adjusted; when the first time interval is less than the first reference delay, moving a phase of the display Vsync signal of the source end device forward by one time step; or when the difference between the first reference delay and the first time interval is less than the first preset threshold, stopping adjusting the display Vsync signal of the source end device.

In a possible implementation, the first time information indicates the second time point at which the destination end device starts receiving the first bitstream; and the adjusting of the display Vsync signal of the source end device based on the first time information includes: obtaining a second reference delay, where the second reference delay is a reference delay between the second time point and a time point at which the destination end device completes decoding; obtaining a second time interval, where the second time interval is a delay between the second time point and a time point at which the destination end device starts displaying the first video data; and adjusting the display Vsync signal of the source end device until a difference between the second reference delay and the second time interval is less than a second preset threshold.

In a possible implementation, the first time information indicates the third time point at which the destination end device starts decoding the first bitstream; and the adjusting of the display Vsync signal of the source end device based on the first time information includes: obtaining a third reference delay, where the third reference delay is a reference delay between the third time point and a time point at which the destination end device completes decoding the first bitstream; obtaining a third time interval, where the third time interval is a delay between the third time point and a time point at which the destination end device starts displaying the first video data; and adjusting the display Vsync signal of the source end device until a difference between the third reference delay and the third time interval is less than a third preset threshold.

In a possible implementation, the first time information indicates the fourth time point at which the destination end device completes decoding the first bitstream; and the adjusting of the display Vsync signal of the source end device based on the first time information includes: obtaining a fourth reference delay, where the fourth reference delay is a reference delay between the fourth time point and a time point at which the destination end device starts displaying the first video data; and adjusting the display Vsync signal of the source end device until the fourth reference delay is less than a fourth preset threshold.

In a possible implementation, the adjusting of the display Vsync signal of the source end device until the fourth reference delay is less than a fourth preset threshold includes: when the fourth reference delay is less than TFrame/2, moving a phase of the display Vsync signal of the source end device backward by one time step, where the time step is a smallest time unit by which a clock of the source end device can be adjusted, and TFrame is a time interval between two adjacent frames displayed by the destination end device; when the fourth reference delay is greater than TFrame/2, moving a phase of the display Vsync signal of the source end device forward by one time step; or when the fourth reference delay is less than the fourth preset threshold, stopping adjusting the display Vsync signal of the source end device.

In a possible implementation, the first time information indicates the third time point at which the destination end device starts decoding the first bitstream; and the adjusting of the display Vsync signal of the destination end device based on the first time information includes: obtaining a fifth reference delay, where the fifth reference delay is a reference delay between the third time point and a time point at which the destination end device starts displaying the first video data; and adjusting the display Vsync signal of the source end device until the fifth reference delay is less than a fifth preset threshold.

In a possible implementation, the first video data is a first slice in a frame of video data, and when sending a first bitstream to a destination end device, the method further includes: encoding a second slice in the frame of video data to obtain a second bitstream, where the second slice is adjacent to the first slice; the first time information indicates the third time point at which the destination end device starts decoding the first bitstream; and the adjusting of the display Vsync signal of the destination end device based on the first time information includes: obtaining a sixth reference delay, where the sixth reference delay is a reference delay between the third time point and a time point at which the destination end device starts displaying the first row of image data of the first slice; and adjusting the display Vsync signal of the source end device until the sixth reference delay is less than a sixth preset threshold.

A third aspect of this application provides a destination end device. The destination end device includes: a receiving unit (e.g., receiving circuit), configured to receive a first bitstream from a source end device, where the first bitstream is obtained by encoding first video data; an obtaining unit (e.g., obtaining circuit), configured to obtain first time information of the first bitstream, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream; and an adjusting unit (e.g., adjusting circuit), configured to adjust a display of the Vsync signal of the destination end device based on the first time information.

It should be understood that the destination end device may be an entire device or a processor chip in an entire device. For example, the destination end device may be a television with a display or a smart screen, or the destination end device may be a processor chip in a television or a smart screen.

In a possible implementation, the first time information indicates the first time point at which the source end device starts encoding the first bitstream; the obtaining unit is configured to: extract the first time point from the first bitstream; and the adjusting unit is configured to: obtain a first reference delay, where the first reference delay is a reference delay between the first time point and a time point at which the destination end device completes decoding the first bitstream; obtain a first time interval, where the first time interval is a delay between the first time point and a time point at which the destination end device starts displaying the first video data; and adjusting the display Vsync signal of the destination end device until a difference between the first reference delay and the first time interval is less than a first preset threshold.

In a possible implementation, the first time information indicates the second time point at which the destination end device starts receiving the first bitstream; and the obtaining unit is configured to: record the second time point at which the receiving unit receives the first bitstream; and the adjusting unit is configured to: obtain a second reference delay, where the second reference delay is a reference delay between the second time point and a time point at which the destination end device completes decoding; obtain a second time interval, where the second time interval is a delay between the second time point and a time point at which the destination end device starts displaying the first video data; and adjusting the display Vsync signal of the destination end device until a difference between the second reference delay and the second time interval is less than a second preset threshold.

In a possible implementation, the first time information indicates the third time point at which the destination end device starts decoding the first bitstream; and the obtaining unit is configured to: obtain the third time point from a decoder side of the destination end device; and the adjusting unit is configured to: obtain a third reference delay, where the third reference delay is a reference delay between the third time point and a time point at which the destination end device completes decoding the first bitstream; obtain a third time interval, where the third time interval is a delay between the third time point and a time point at which the destination end device starts displaying the first video data; and adjusting the display Vsync signal of the destination end device until a difference between the third reference delay and the third time interval is less than a third preset threshold.

In a possible implementation, the first time information indicates the fourth time point at which the destination end device completes decoding the first bitstream; and the obtaining unit is configured to: obtain the fourth time point from a decoder side of the destination end device; and the adjusting unit is configured to: obtain a fourth reference delay, where the fourth reference delay is a reference delay between the fourth time point and a time point at which the destination end device starts displaying the first video data; and adjusting the display Vsync signal of the destination end device until the fourth reference delay is less than a fourth preset threshold.

In a possible implementation, the destination end device further includes: a decoding unit (e.g., decoding circuit), configured to: decode the first bitstream to obtain a first row of image data, where the first row of image data is a row of the first video data; and when decoding the first bitstream data to obtain a second row of image data, send the first row of image data to a display for display, where the first time information indicates the third time point at which the destination end device starts decoding the first bitstream; and the adjusting unit is configured to: obtain a fifth reference delay, where the fifth reference delay is a reference delay between the third time point and a time point at which the destination end device starts displaying the first video data; and adjusting the display Vsync signal of the destination end device until the fifth reference delay is less than a fifth preset threshold.

In a possible implementation, the first video data is a first slice in a frame of video data, and the first time information indicates the third time point at which the destination end device starts decoding the first bitstream; and the adjusting unit is configured to: obtain a sixth reference delay, where the sixth reference delay is a reference delay between the third time point and a time point at which the destination end device starts displaying the first row of image data of the first slice; and adjusting the display Vsync signal of the destination end device until the sixth reference delay is less than a sixth preset threshold.

A fourth aspect of this application provides a source end device. The source end device includes: a sending unit (e.g., sending circuit), configured to send a first bitstream to a destination end device, where the first bitstream is obtained by encoding first video data; and an adjusting unit (e.g., adjusting circuit), configured to adjust a display Vsync signal of the source end device based on first time information, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream.

It should be understood that the source end device may be an entire device or a processor chip in an entire device. For example, the source end device may be a mobile phone, or the destination end device may be a processor chip in a mobile phone.

In a possible implementation, the first time information indicates the first time point at which the source end device starts encoding the first bitstream; and the source end device further includes: a recording unit (e.g., recording circuit), configured to record the first time point at which encoding of the first bitstream starts; and the adjusting unit is configured to: obtain a first reference delay, where the first reference delay is a reference delay between the first time point and a time point at which the destination end device completes decoding the first bitstream; obtain a first time interval, where the first time interval is a delay between the first time point and a time point at which the destination end device starts displaying the first video data; and adjusting the display Vsync signal of the source end device until a difference between the first reference delay and the first time interval is less than a first preset threshold.

In a possible implementation, the first time information indicates the second time point at which the destination end device starts receiving the first bitstream; and the adjusting unit is configured to: obtain a second reference delay, where the second reference delay is a reference delay between the second time point and a time point at which the destination end device completes decoding; obtain a second time interval, where the second time interval is a delay between the second time point and a time point at which the destination end device starts displaying the first video data; and adjusting the display Vsync signal of the source end device until a difference between the second reference delay and the second time interval is less than a second preset threshold.

In a possible implementation, the first time information indicates the third time point at which the destination end device starts decoding the first bitstream; and the adjusting unit is configured to: obtain a third reference delay, where the third reference delay is a reference delay between the third time point and a time point at which the destination end device completes decoding the first bitstream; obtain a third time interval, where the third time interval is a delay between the third time point and a time point at which the destination end device starts displaying the first video data; and adjusting the display Vsync signal of the source end device until a difference between the third reference delay and the third time interval is less than a third preset threshold.

In a possible implementation, the first time information indicates the fourth time point at which the destination end device completes decoding the first bitstream; and the adjusting unit is configured to: obtain a fourth reference delay, where the fourth reference delay is a reference delay between the fourth time point and a time point at which the destination end device starts displaying the first video data; and adjusting the display Vsync signal of the source end device until the fourth reference delay is less than a fourth preset threshold.

In a possible implementation, the first time information indicates the third time point at which the destination end device starts decoding the first bitstream; and the adjusting unit is configured to: obtain a fifth reference delay, where the fifth reference delay is a reference delay between the third time point and a time point at which the destination end device starts displaying the first video data; and adjusting the display Vsync signal of the source end device until the fifth reference delay is less than a fifth preset threshold.

In a possible implementation, the source end device further includes an encoding unit, the first video data is a first slice in a frame of video data, and when the sending unit sends the first bitstream to the destination end device, the encoding module is configured to: encode a second slice in the frame of video data to obtain a second bitstream, where the second slice is adjacent to the first slice; the first time information indicates the third time point at which the destination end device starts decoding the first bitstream; and the adjusting unit is configured to: obtain a sixth reference delay, where the sixth reference delay is a reference delay between the third time point and a time point at which the destination end device starts displaying the first row of image data of the first slice; and adjusting the display Vsync signal of the source end device until the sixth reference delay is less than a sixth preset threshold.

A fifth aspect of this application provides a destination end device. The destination end device includes a processor and a transmission interface. The transmission interface is configured to receive and send data. The processor is configured to invoke program instructions stored in a memory, to perform the method according to any one of the first aspect or the possible implementations of the first aspect.

In a possible implementation, the destination end device further includes a display.

In a possible implementation, the destination end device further includes an antenna system, and the destination end device performs wireless communication with a source end device by using the antenna system.

A sixth aspect of this application provides a source end device. The source end device includes a processor and a transmission interface. The transmission interface is configured to receive and send data. The processor is configured to invoke program instructions stored in a memory, to perform the method according to any one of the second aspect or the possible implementations of the second aspect.

In a possible implementation, the source end device further includes a memory.

In a possible implementation, the source end device further includes an antenna system, and the source end device performs wireless communication with a destination end device by using the antenna system.

A seventh aspect of this application provides a computer-readable storage medium. The computer-readable storage medium stores instructions. When the instructions are run on a computer or a processor, the computer or the processor is enabled to perform the method according to any one of the first aspect or the possible implementations of the first aspect, or any one of the second aspect or the possible implementations of the second aspect.

An eighth aspect of this application provides a computer program product including instructions. When the instructions are run on a computer or a processor, the computer or the processor is enabled to perform the method according to any one of the first aspect or the possible implementations of the first aspect, or any one of the second aspect or the possible implementations of the second aspect.

It should be understood that the second aspect to the eighth aspect and any possible implementation of the second aspect to the eighth aspect have similar beneficial effects as the first aspect and any possible implementation of the first aspect.

BRIEF DESCRIPTION OF DRAWINGS

FIG. 14 is a flowchart of an example of a wireless projection method according to an embodiment of this application;

FIG. 15 is a schematic diagram of an architecture of an example of a terminal according to an embodiment of this application;

DESCRIPTION OF EMBODIMENTS

In the specification, embodiments, claims, and accompanying drawings of this application, the terms "first", "second", and the like are intended to distinguish between similar objects, but do not necessarily indicate a specific order or sequence. Moreover, the terms "include", "have", and any other variant thereof are intended to cover a non-exclusive inclusion, for example, including a series of steps or units (e.g., circuits). Methods, systems, products, or devices are not necessarily limited to those explicitly listed steps or units, but may include other steps or units that are not explicitly listed or that are inherent to such processes, methods, products, or devices.

It should be understood that, in this application, "at least one piece (item)" means one or more, and "a plurality of" means two or more. "And/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate a, b, c, "a and b", "a and c", "b and c", or "a, b, and c", where a, b, and c may be singular or plural.

Figure 1:
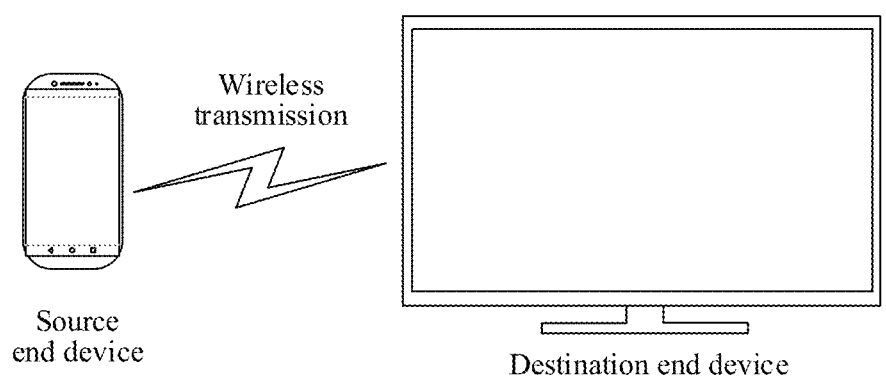
FIG. 1 is a schematic diagram of an example of an application scenario according to an embodiment of this application.

FIG. 1 is a schematic diagram of an example of an application scenario according to an embodiment of this application. A source end device transmits, through a wireless transmission channel, a media file such as consecutive video frames or specified image frames to a destination end device for display. Generally, to reduce an amount of transmitted data, the source end device may send a to-be-transmitted media file to the destination end device through a wireless transmission after encoding and compressing the to-be-transmitted media file. The destination end device is configured to decode and display the received media file. The consecutive video frames may also be referred to as an image sequence, for example, the consecutive video frames may be images in a video stream or an associated multi-frame image sequence (for example, a plurality of photos shot in a continuous shooting mode).

For example, an image processing method provided in some embodiments may be used in a plurality of wireless projection application scenarios such as game projection, video projection (for example, recorded video projection), or projection of an associated multi-frame image sequence (for example, slide (PowerPoint, PPT) projection).

For example, the wireless communication method may include communication manners such as a wireless local area network (WLAN), wireless fidelity (Wi-Fi), Bluetooth (BT), a global navigational satellite system (GNSS), frequency modulation (FM), near field communication (NFC), and infrared (IR) communication.

For example, the source end device may be an electronic device, such as a mobile phone, a wearable device (for example, a watch or a band), a tablet computer, a vehicle-mounted device, a notebook computer, an ultra-mobile personal computer (UMPC), a netbook, or a personal digital assistant (PDA), that has strong processing capabilities such as graphics rendering and encoding. Alternatively, the source end device may be a device, such as a mobile phone or a tablet computer, that has strong user interaction and is easy to operate. The destination end device may be an electronic device, such as a television, a large screen device, an augmented reality (AR) device, or a virtual reality (VR) device, that has a a display capability.

The source end device may have functions such as image obtaining, encoding, and sending. Obtaining the images include obtaining a downloaded video image, a recorded video image, or a video image generated by using an application program, obtaining a video image in another manner, or the like. For video images that are generated by using an application program, for example, a game video image, the source end device may further have a function such as graphics rendering. The destination end device has functions of image receiving, decoding, and display. In some embodiments, the destination end device is a physical device, and includes an interface module and a display module. In some other embodiments, the destination end device may include two independent physical devices, to be specific, a decoding device and a display device. The decoding device is configured to perform processing such as receiving and decoding on the image. The display device is configured to display the image, and may be further configured to perform related processing such as image enhancement on the to-be-displayed image. In some embodiments, the decoding device and the display device may be integrated into one physical device. In some other embodiments, the decoding device and the display end device are two physical devices that are independent of each other.

Figure 2:
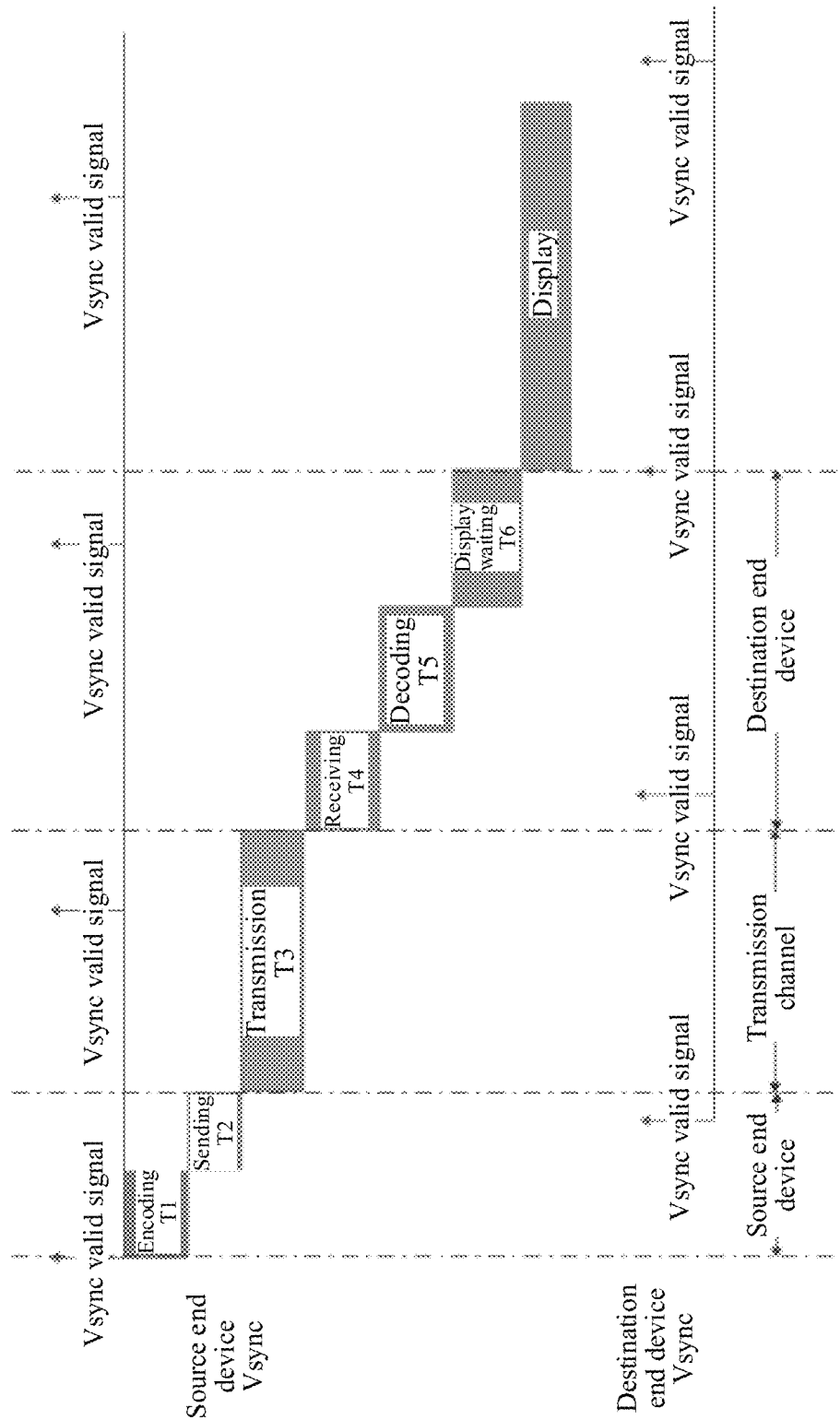
FIG. 2 is a schematic diagram of an end-to-end delay generated in a wireless projection process according to an embodiment of this application.

Refer to FIG. 2. An end-to-end delay generated in a wireless projection process is described as an example. In some embodiments, transmitting a video stream is used as an example for description. The end-to-end delay generated when a video stream of a source end device is transmitted to a destination end device for display includes: an encoding delay T1 and a sending delay T2 generated on a source end device side, a transmission delay T3 generated on a wireless transmission channel, and a receiving delay T4, a decoding delay T5, and a display waiting delay T6 that are generated on a destination end device side. The sending delay T2 is time occupied by the source end device to pack a bitstream obtained through encoding into a data packet compliant with a transmission protocol and send the data packet to a communication processor. The receiving delay T4 is time occupied by the destination end device to receive the data packet and parse the data packet to obtain the bitstream. The display waiting delay T6 is caused by phase asynchronization between the display vertical synchronization (Vsync) signals of the source end device and the destination end device. The following describes a reason why the display waiting delay T6 is generated. Usually, both the source end device and the destination end device have their own display Vsync signals, and the Vsync signal includes Vsync valid signals that periodically appear. Because the first Vsync valid signal arrives at the same time when the device is turned on, and time points at which the source end device and the destination end device are turned on are not synchronous, phases of the display Vsync signals of the source end device and the destination end device are not synchronous.

FIG. 2 shows four Vsync valid signals of the Vsync signal of the source end device and four Vsync valid signals of the Vsync signal of the destination end device. The source end device starts encoding when the Vsync valid signal of the source end device arrives, and the destination end device performs the display when the Vsync valid signal of the destination end device arrives. Therefore, the destination end device usually cannot perform the display immediately after completing decoding, and can only perform the display after the Vsync valid signal of the destination end device arrives. Consequently, the display waiting delay T6 is generated. Because phases of the Vsync signal of the source end device and the Vsync signal of the destination end device are random, the generated display waiting delay T6 is also random. How to reduce the display waiting delay T6 as much as possible is a key to reducing the end-to-end delay.

Figure 3:
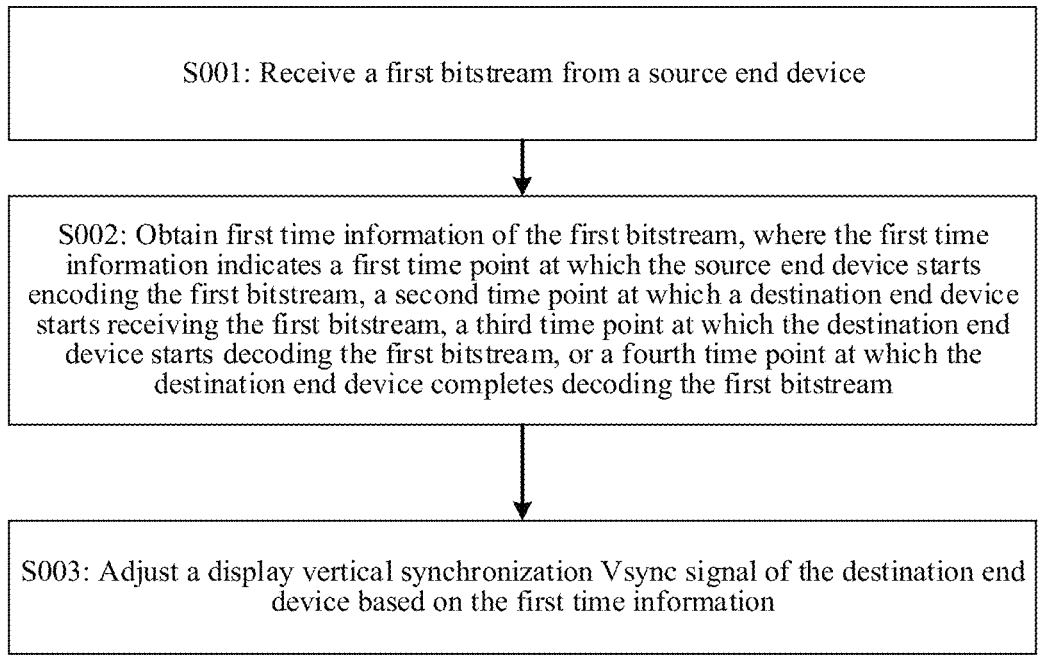
FIG. 3 is a flowchart of an example of a wireless projection method according to an embodiment of this application.

FIG. 3 shows a wireless projection method according to an embodiment of this application. The wireless projection method is applied to a destination end device, and the method includes the following steps.

S001: Receive a first bitstream from a source end device.

It should be understood that the first bitstream is obtained by encoding first video data.

S002: Obtain first time information of the first bitstream.

The first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream.

S003: Adjust a display Vsync signal of the destination end device based on the first time information.

In some embodiments, the destination end device gradually adjusts the display Vsync signal of the destination end device by obtaining time information of the source device or by obtaining determined time points. Some examples of determined time points include a time point at which the destination end device starts receiving a bitstream, a time point at which the destination end device receives the bitstream, a time point at which decoding starts (where the time point at which decoding starts may be approximately equal to the time point at which the destination end device receives the bitstream), and a time point at which decoding is completed, that can be obtained by the destination end device. By obtaining time information of the source device or by obtaining determined time points, the display Vsync signals of the source end device and the destination end device can become synchronized, to reduce a display waiting delay caused by asynchronization of the display Vsync signals of the source end device and the destination end device.

Figure 4A:
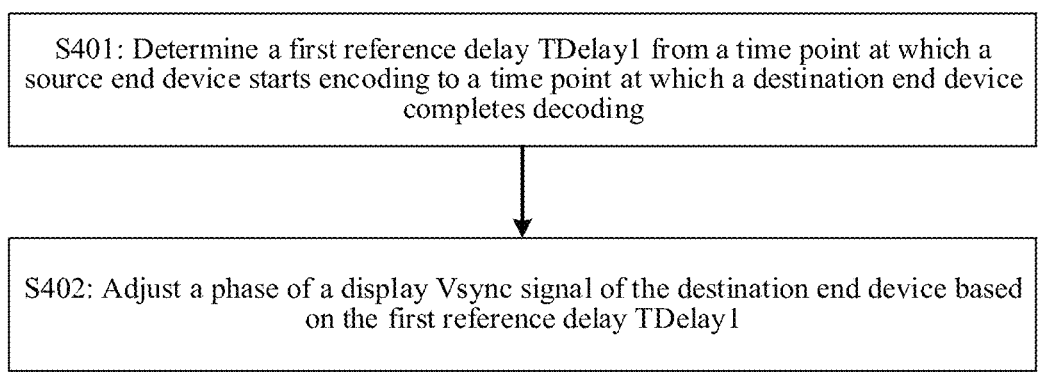
FIG. 4a is a flowchart of an example of a wireless projection method according to an embodiment of this application.

FIG. 4a shows a wireless projection method according to an embodiment of this application. In this embodiment, first time information indicates a first time point at which a source end device starts encoding a first bitstream, and the first time point is carried in the first bitstream. The method includes the following steps.

S401: Determine a first reference delay TDelay1 from the time point at which the source end device starts encoding to a time point at which a destination end device completes decoding.

In an optional case, before S401, the method further includes: adjusting clocks of the source end device and the destination end device, so that the network clocks of the two devices are synchronized.

It should be understood that, that the network clocks of the two devices are synchronized indicates that the two devices have a same time basis. For example, when the source end device is at 8 o'clock, the destination end device is also at 8 o'clock. In an optional case, synchronizing the network clocks of the two devices may also be referred to as clock alignment of the two devices. For example, clock synchronization may be performed on the source end device and the destination end device according to a precision clock synchronization protocol (PTP). PTP is a protocol for performing time and frequency synchronization on a standard Ethernet terminal device, and is also referred to as Institute of Electrical and Electronics Engineers (IEEE) 1588. IEEE 1588 has two releases: IEEE 1588v1 and IEEE 1588v2. Synchronization precision at a sub-millisecond level can be implemented according to IEEE 1588v1, and synchronization precision at a sub-microsecond level can be implemented according to IEEE 1588v2.

The first reference delay TDelay1 includes T1+T2+T3+T4+T5 shown in FIG. 2. Because an encoding feature of the source end device, a transmission rate of a wireless transmission channel, a decoding feature of the destination end device, and the like are all uncertain, the first reference delay is not a determined value, but fluctuates within a specific range, and a first reference delay generated each time a frame of data is transmitted may be different.

Figure 4B:
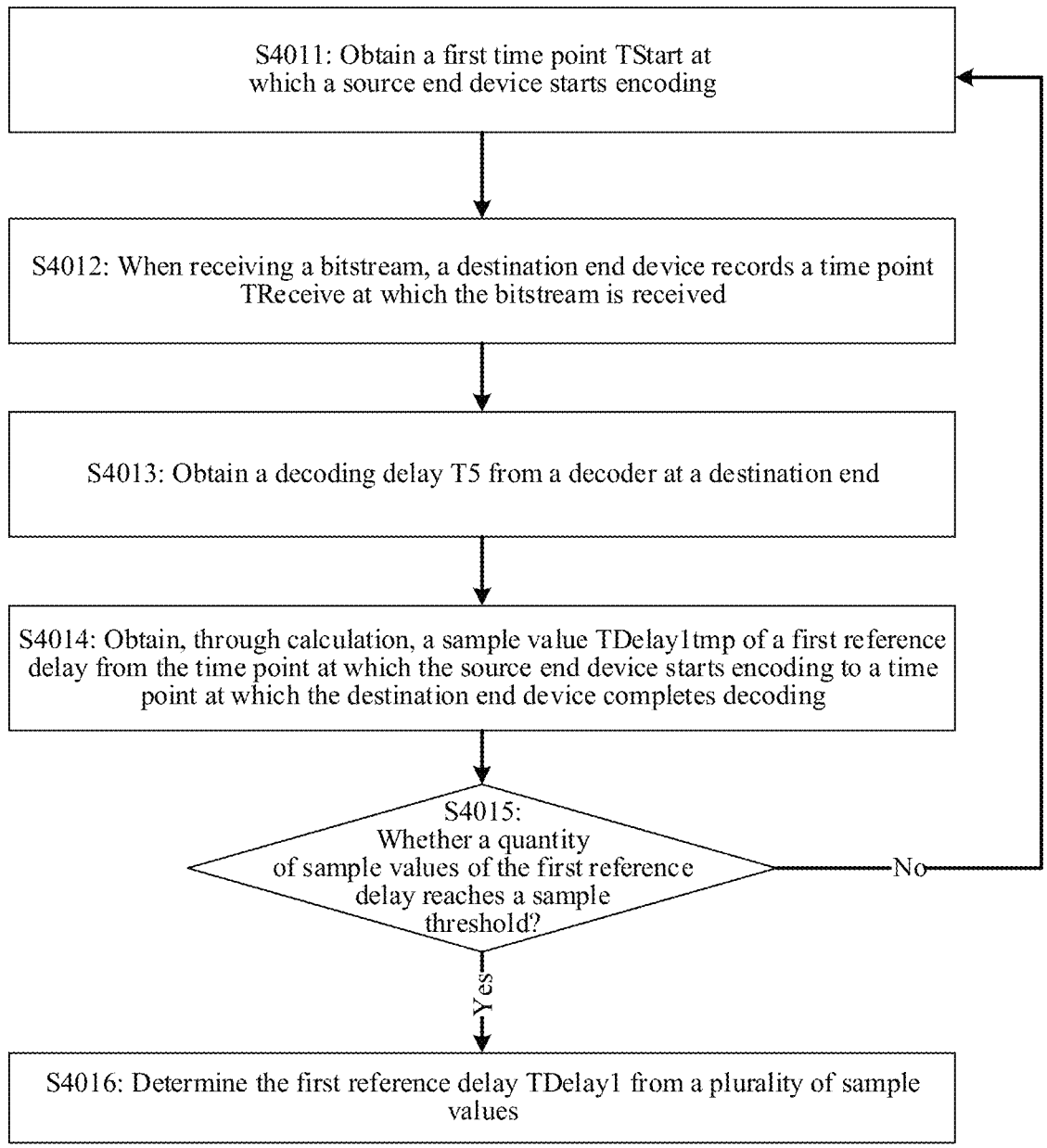
FIG. 4b is a flowchart of an example of a first reference delay obtaining method according to an embodiment of this application.

In some embodiments, the first reference delay TDelay1 may be an empirical value, and is considered by the source end device and the destination end device in advance. The empirical value may be obtained in advance through a large quantity of experiments. In an optional case, all frames of transmitted data may be measured in a wireless projection process to obtain a plurality of sample values of the first reference delay, and then the first reference delay TDelay1 is obtained based on sample statistics. FIG. 4b shows a statistics collection method for obtaining TDelay1 according to an embodiment of this application. The statistics collection method includes the following steps.

S4011: Obtain a first time point TStart at which the source end device starts encoding.

For example, the first time point may be carried in a bitstream, or may be sent to the destination end device by using a separate message independent of the bitstream. The first time point corresponds to a time point at which a Vsync valid signal for starting encoding appears. The first time point TStart may be recorded when the source end device starts encoding.

S4012: When receiving a bitstream, the destination end device records a time point TReceive at which the bitstream is received.

It should be understood that, TReceive indicates a time point at which the destination end device successfully receives the bitstream, and TReceive may also be approximately equivalent to a time point at which the destination end device starts decoding the bitstream. A total delay from the time point at which the source end device starts decoding to the time point at which the destination end device receives the bitstream may be obtained according to TReceive−TStart, that is, TReceive−TStart=T1+T2+T3+T4.

S4013: Obtain a decoding delay T5 from a decoder at a destination end.

S4014: Obtain, through calculation, a sample value TDelay1tmp of the first reference delay from the time point at which the source end device starts encoding to the time point at which the destination end device completes decoding.

It should be understood that, one sample value of the first reference delay may be obtained by adding the decoding delay T5 to the total delay from the time point at which the source end device starts decoding to the time point at which the destination end device receives the bitstream, that is, TDelay1tmp=TReceive−TStart+T5.

S4015: Determine whether a quantity of sample values of the first reference delay reaches a sample threshold. If not, perform S4011; if yes, perform step S4016.

S4016: Determine the first reference delay TDelay1 from a plurality of sample values.

It should be understood that, as a quantity of times of cycles increases, obtained sample values of the first reference delay gradually converge. Therefore, to obtain the first reference delay that can accurately reflect a delay situation, the quantity of sample values of the first reference delay needs to be as large as possible. That is, the sample threshold needs to be as large as possible.

In an optional case, a largest value in the plurality of sample values of the first reference delay is used as TDelay1.

In another optional case, the plurality of sample values of the first reference delay are sorted in descending order, and a median value of the plurality of sample values is used as TDelay1, or a (sample value quantity×X %)$^{th}$ sample value from the beginning is used as TDelay1. For example, the total quantity of sample values of the first reference delay is 100, and X is 5. In this case, the 100 sample values are sorted in descending order, and the fifth sample value is used as TDelay1. It should be understood that, some extreme cases in which the first reference delay is excessively long due to an extreme environment of disturbance or extremely poor network may be excluded by flexibly setting X, and most cases are met at a much higher rate, for example, 90% to 99% cases are met. Therefore, a value of X is generally small, so that the obtained sample value is a large value in the plurality of sample values. It is clear that, the plurality of sample values of the first reference delay may alternatively be sorted in ascending order, and then a later sample value is used as TDelay1. It should be understood that, as the quantity of sample values of the first reference delay increases, TDelay1 gradually converges to a fixed value.

S402: Adjust a phase of a display Vsync signal of the destination end device based on the first reference delay TDelay1.

Figure 5:
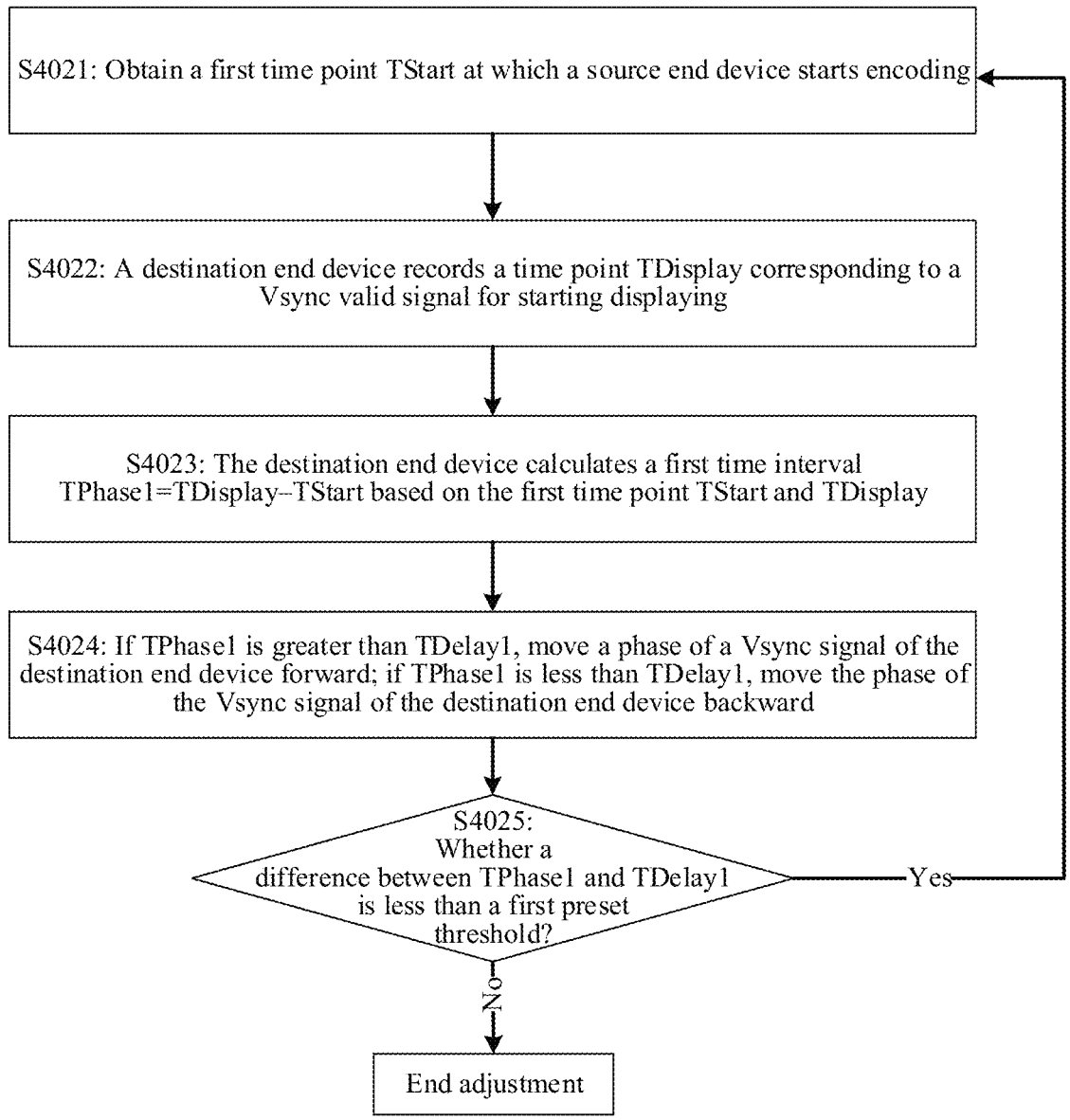
FIG. 5 is a flowchart of an example of a method for adjusting a display vertical synchronization (Vsync) signal of a destination end device according to an embodiment of this application.

FIG. 5 shows an example of a method for adjusting the display Vsync signal of the destination end device according to an embodiment of this application. S402 includes the following steps.

S4021: Obtain a first time point TStart at which the source end device starts encoding.

S4022: The destination end device records a time point TDisplay corresponding to a Vsync valid signal for starting displaying.

For example, the destination end device generates an interrupt when the Vsync valid signal for starting displaying occurs, and records a corresponding time point as TDisplay.

S4023: The destination end device calculates a first time interval TPhase1 based on the first time point TStart and TDisplay, where the first time interval TPhase1 indicates a total delay generated from a time point at which the source end device starts encoding to a time point at which the destination end device performs display.

For example, TPhase1 may be calculated according to the following formula:

TPhase1=TDisplay−TStart

S4024: If TPhase1 is greater than TDelay1, move a phase of a Vsync signal of the destination end device forward; or if TPhase1 is less than TDelay1, move the phase of the Vsync signal of the destination end device backward.

That the phase of the Vsync signal is moved forward may be understood as that a time point of generating the Vsync valid signal is moved toward a direction closer to an origin of a time axis, and that the phase of the Vsync signal is moved backward may be understood as that the time point of generating the Vsync valid signal is moved towards a direction away from the origin of the time axis. For example, when the phase of the Vsync signal at the destination end is moved, the phase of the Vsync signal at the destination end is moved only by one STEP each time, and the STEP is a smallest time unit by which a clock can be adjusted. For example, a smallest time unit by which the destination end device can be adjusted is 50 μs. Then, if TPhase1 is greater than TDelay1, the phase of the Vsync signal of the destination end device is moved forward by 50 μs; or if TPhase1 is less than TDelay1, the phase of the Vsync signal of the destination end device is moved backward by 50 μs.

S4025: Determine whether a difference between TPhase1 and TDelay1 is less than a first preset threshold. If not, perform step S4021; if yes, end the adjustment.

It should be understood that, after each adjustment, the destination end device displays a latest received video frame based on the adjusted Vsync signal. When the difference between TPhase1 and TDelay1 is greater than the first preset threshold, S4021 to S4024 are repeatedly performed to adjust the phase of the Vsync signal of the destination end device step by step. When TPhase1 is equal to TDelay1, it is equivalent to describing that the display waiting delay T6 is completely eliminated. In this case, it is considered that a phase of a Vsync signal of the source end device and the phase of the Vsync signal of the destination end device are synchronized. However, in an actual case, TPhase1 may not be completely equal to TDelay1. Alternatively, when the difference between TPhase1 and TDelay1 is less than a preset threshold, or the difference between TPhase1 and TDelay1 is fixed within a specific difference interval, it may be considered that the phase of the Vsync signal of the source end device and the phase of the Vsync signal of the destination end device are basically synchronized.

In some embodiments, the destination end device may obtain the time information on the source end device side, and adjust the phase of the Vsync signal of the destination end device based on the time information, to eliminate the display waiting delay T6 and reduce the end-to-end delay from the time point at which the source end device starts encoding to the time point at which the destination end device starts displaying. The source end device sends a time stamp for starting encoding to the destination end device, and a time in which the destination end device receives the bitstream and a time required for decoding may be obtained. In this way, the first reference delay from the time point at which the source end device starts encoding to the time point at which the destination end device completes decoding may be obtained, and the time point at which the destination end device starts displaying may also be obtained. Therefore, the first time interval from the time point at which the source end device starts encoding to the time point at which the destination end device performs display may be further obtained. If the phase of the Vsync signal of the destination end device is adjusted so that the first time interval is equal to the first reference delay, it is equivalent to describing that the display waiting delay T6 is eliminated.

In an optional case, after obtaining TPhase1 and TDelay1, the destination end device may send TPhase1 and TDelay1 to the source end device, and then the source end device adjusts the phase of the Vsync signal of the source end device. In this way, phase synchronization between the Vsync signal of the source end device and the Vsync signal of the destination end device is implemented. In this case, if TPhase1 is greater than TDelay1, the phase of the Vsync signal of the source end device is moved backward; or if TPhase1 is less than TDelay1, the phase of the Vsync signal of the source end device is moved forward. In another optional case, the statistics of TDelay1 and the calculation of the TPhase1 may alternatively be completed by the source end device. Further, the source end device adjusts the phase of the Vsync signal of the source end device based on the obtained TPhase1 and TDelay1, to eliminate the display waiting delay T6 of the destination end device.

Figure 6:
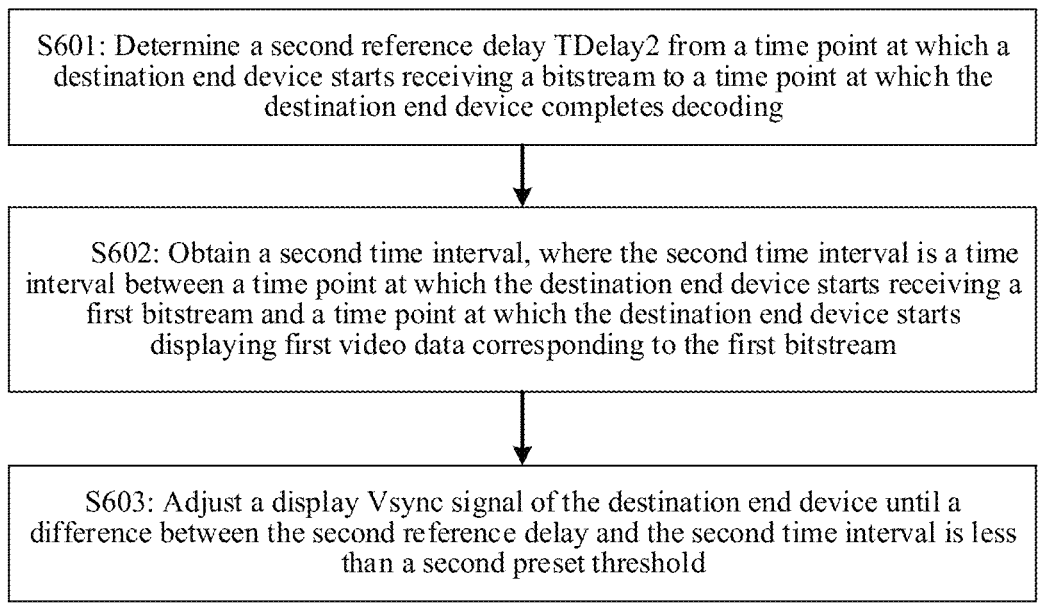
FIG. 6 is a flowchart of an example of a wireless projection method according to an embodiment of this application.

FIG. 6 shows another wireless projection method according to an embodiment of this application. In this embodiment, first time information indicates a second time point at which a destination end device starts receiving a first bitstream. The method includes the following steps.

S601: Determine a second reference delay TDelay2 from the time point at which the destination end device starts receiving a bitstream to a time point at which the destination end device completes decoding.

The second reference delay TDelay2 is a sum of a receiving delay T4 generated when the destination end device receives the bitstream and a decoding delay T5 generated when the destination end device decodes the bitstream. That is, the second reference delay TDelay2 is a reference value of T4+T5, or the second reference delay TDelay2 may represent an empirical value of T4+T5 in most cases. Generally, T4 and T5 are not fixed, but rather are uncertain. Therefore, the second reference delay is not a determined value, but fluctuates within a specific range, and a second reference delay generated each time a frame of data is transmitted may be different.

In some embodiments, the second reference delay TDelay2 may be an empirical value, and the empirical value may be obtained in advance through a large quantity of experiments. In an optional case, all frames of transmitted data may be measured in a wireless projection process to obtain a plurality of sample values of the second reference delay, and then the second reference delay TDelay2 is obtained based on sample statistics.

Figure 7:
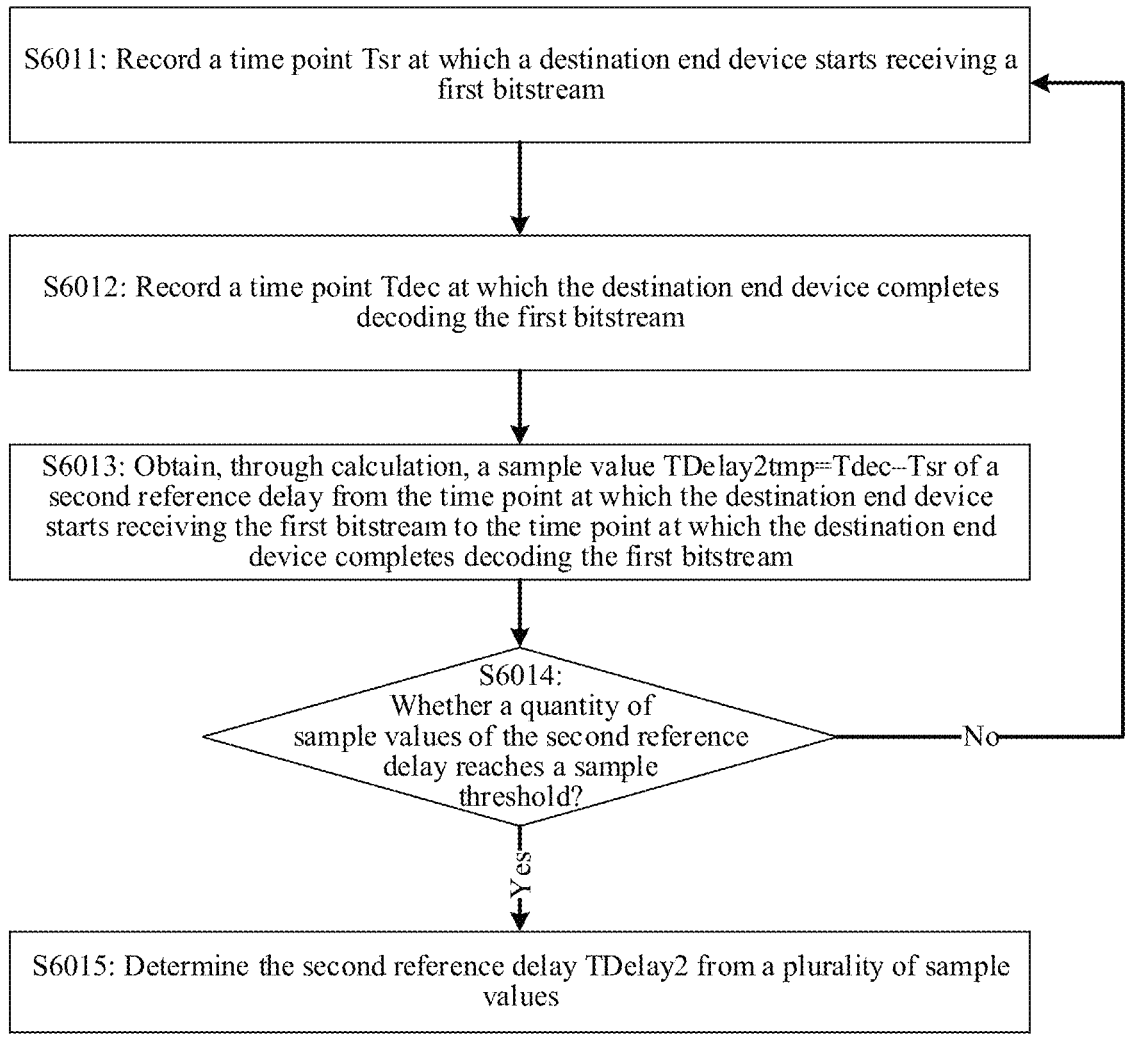
FIG. 7 is a flowchart of an example of a second reference delay obtaining method according to an embodiment of this application.

FIG. 7 shows a statistics collection method for obtaining TDelay2 according to an embodiment of this application. The statistics collection method includes the following steps.

S6011: Record a time point Tsr at which the destination end device starts receiving the first bitstream.

S6012: Record a time point Tdec at which the destination end device completes decoding the first bitstream.

S6013: Obtain, through calculation, a sample value TDelay2tmp of the second reference delay from the time point at which the destination end device starts receiving the first bitstream to the time point at which the destination end device completes decoding the first bitstream.

It should be understood that, TDelay2tmp=Tdec−Tsr.

S6014: Determine whether a quantity of sample values reaches a sample threshold. If not, perform S6011; if yes, perform S6015.

It should be understood that, as a quantity of times of cycles increases, obtained sample values of the second reference delay gradually converge. Therefore, to obtain the second reference delay that can accurately reflect a delay situation, the sample threshold needs to be as large as possible.

S6015: Determine the second reference delay TDelay2 from a plurality of sample values.

In an optional case, a largest value in the plurality of sample values of the second reference delay is used as TDelay2.

In another optional case, the plurality of sample values of the second reference delay are sorted in descending order, and a median value of the plurality of sample values is used as TDelay2, or a (sample value quantity×X %)$^{th}$ sample value from the beginning is used as TDelay2. For example, the total quantity of sample values of the first reference delay is 100, and X is 5. That is, the fifth sample value in descending order is used as TDelay2. It should be understood that, as the quantity of sample values of the second reference delay increases, TDelay2 gradually converges to a fixed value.

S602: Obtain a second time interval, where the second time interval is a time interval between the time point at which the destination end device starts receiving the first bitstream and a time point at which the destination end device starts displaying first video data corresponding to the first bitstream.

It should be understood that, the second time interval is a total delay T4+T5+T6 generated on a destination end device side in a process of displaying a video bitstream.

In other words, the obtaining a second time interval includes: recording a time point Tsr at which the destination end device starts receiving the first bitstream; and recording, by the destination end device, a time point TDisplay corresponding to a Vsync valid signal for starting the displaying.

For example, the destination end device generates an interrupt when the Vsync valid signal for starting the displaying occurs, and records a corresponding time point as TDisplay.

The second time interval TPhase2=TDisplay−Tsr.

S603: Adjust the display Vsync signal of the destination end device until a difference between the second reference delay and the second time interval is less than a second preset threshold.

TPhase2 is compared with TDelay2. If TPhase2 is greater than TDelay2, a phase of the Vsync signal of the destination end device is moved forward; or if TPhase2 is less than TDelay2, the phase of the Vsync signal of the destination end device is moved backward. For example, when the phase of the Vsync signal at the destination end is moved, the phase of the Vsync signal at the destination end is moved only by one STEP each time, and the STEP is a smallest time unit by which a clock can be adjusted.

It is then determined whether a difference between TPhase2 and TDelay2 is less than a preset threshold. If the difference is greater than or equal to the preset threshold, the second time interval is repeatedly obtained, the second time interval is compared with the second reference delay again, and the phase of the Vsync signal of the destination end device is adjusted step by step until the difference between the second reference delay and the second time interval is less than the second preset threshold. Theoretically, when TPhase2 is equal to TDelay2, it is equivalent to describing that a display waiting delay T6 is completely eliminated. In this case, it is considered that phases of a Vsync signal of a source end device and the Vsync signal of the destination end device are synchronized. However, in an actual case, TPhase2 may not be completely equal to TDelay2. Alternatively, when the difference between TPhase2 and TDelay2 is less than the second preset threshold, or the difference between TPhase2 and TDelay2 is fixed within a specific difference interval, it may be considered that the phase of the Vsync signal of the source end device and the phase of the Vsync signal of the destination end device are basically synchronized. The second preset threshold is a positive value approximately equal to 0.

In some embodiments, the destination end device records the second time point at which the receiving of the first bitstream starts and the time point at which the destination end device completes decoding. In this way, the second reference delay from the time point at which the destination end device starts receiving the bitstream to the time point at which the destination end device completes decoding can be obtained. The second reference delay is equivalent to a reference value of T4+T5, or the second reference delay may represent an empirical value of T4+T5 in most cases. Further, the destination end device obtains the time point at which display starts. In this way, the second time interval from the time point at which the destination end device starts receiving the first bitstream to the time point at which the destination end device starts displaying the first bitstream can be obtained. The second time interval is equivalent to a total delay T4+T5+T6 generated by the destination end device for displaying the first bitstream. If the Vsync signal of the destination end device is adjusted so that the second time interval is equal to the second reference delay, it is equivalent to describing that the display waiting delay T6 is eliminated.

Figure 8:
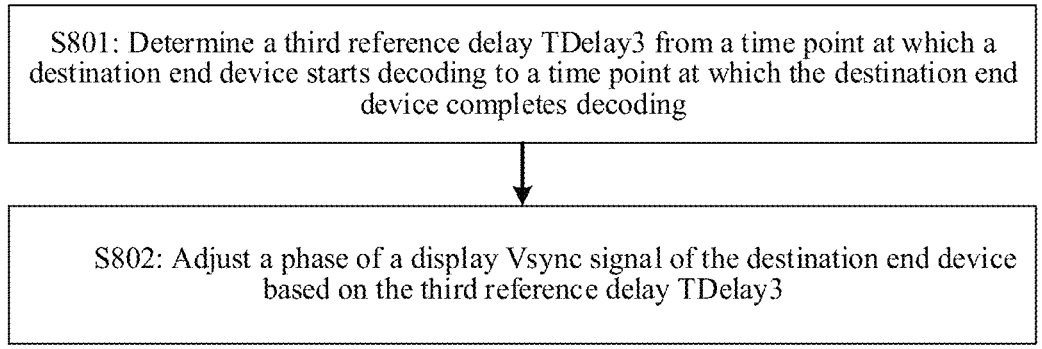
FIG. 8 is a flowchart of an example of a wireless projection method according to an embodiment of this application.

FIG. 8 shows another wireless projection method according to an embodiment of this application. In this embodiment, first time information indicates a third time point at which a destination end device starts decoding a first bitstream. The method includes the following steps.

S801: Determine a third reference delay TDelay3 from the time point at which the destination end device starts decoding to a time point at which the destination end device completes decoding.

The third reference delay TDelay3 is a decoding delay T5 generated by the destination end device during decoding. Because a decoding feature of a decoder is affected by running performance or resource occupation of the destination end device, decoding delays T5 required for decoding all video frames may be different.

In some embodiments, the third reference delay TDelay3 may be an empirical value, and the empirical value may be obtained in advance through a large quantity of experiments. In an optional case, a plurality of time points of the decoding may be repeatedly obtained to obtain a plurality of sample values of T5, and then a larger T5 in the plurality of sample values is obtained as the third reference delay TDelay3. It should be understood that as a quantity of obtained sample values increases, the third reference delay TDelay3 gradually converges to a fixed value. Therefore, to obtain the third reference delay that can accurately reflect a delay situation, the quantity of sample values of the third reference delay needs to be as large as possible. In addition, the largest value usually corresponds to an extreme case such as disturbance. In some embodiments, a plurality of times of sampling are performed to remove disturbance, and T5 that can meet 90% to 99% scenarios is selected. Specifically, the plurality of sample values are sorted in descending order, and a (sample value quantity×X %)$^{th}$ T5 from the beginning is used as the third reference delay TDelay3; or the plurality of sample values are sorted in ascending order, and a (sample value quantity×X %)$^{th}$ T5 from the end is used as the third reference delay TDelay3. For example, a total quantity of sample values of the third reference delay is 100. The 100 sample values are sorted in descending order. If X is 5, the fifth sample value is used as TDelay3.

S802: Adjust a phase of a display Vsync signal of the destination end device based on the third reference delay TDelay3.

Figure 9:
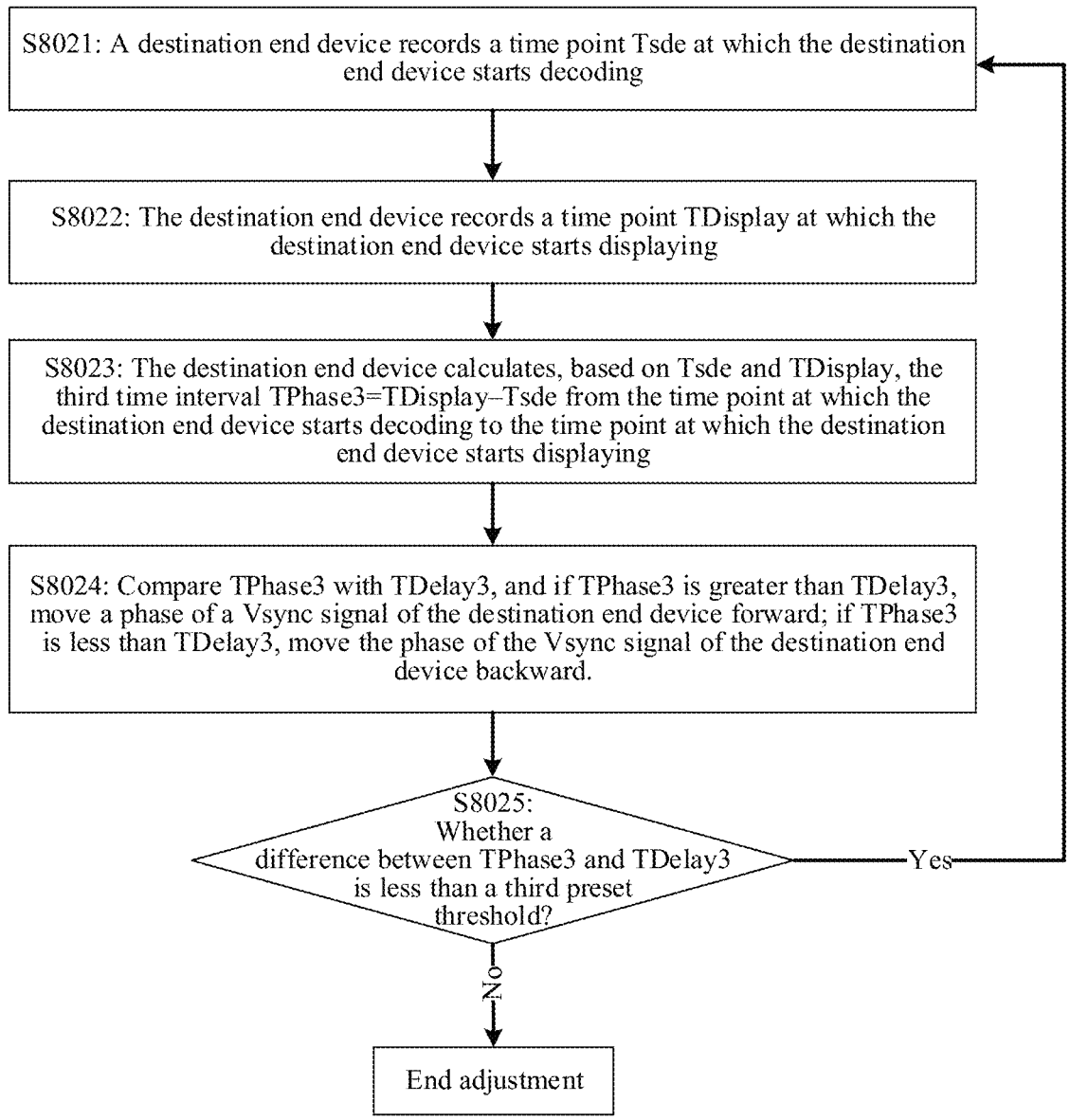
FIG. 9 is a flowchart of an example of a method for adjusting a display Vsync signal of a destination end device according to an embodiment of this application.

FIG. 9 is a flowchart of a method for adjusting the phase of the display Vsync signal of the destination end device based on the third reference delay according to an embodiment of this application. The method includes: S8021: the destination end device records a time point Tsde at which the destination end device starts decoding.

S8022: The destination end device records a time point TDisplay at which the destination end device starts displaying.

The destination end device generates an interrupt when the Vsync valid signal for starting displaying occurs, and records a corresponding time point as TDisplay.

S8023: The destination end device calculates, based on Tsde and TDisplay, the third time interval TPhase3 from the time point at which the destination end device starts decoding to the time point at which the destination end device starts displaying.

For example, TPhase3 may be calculated according to the following formula:

$$TPhase3=TDisplay-Tsde$$

S8024: Compare TPhase3 with TDelay3, and if TPhase3 is greater than TDelay3, move a phase of the Vsync signal of the destination end device forward; or if TPhase3 is less than TDelay3, move the phase of the Vsync signal of the destination end device backward.

That the phase of the Vsync signal is moved forward may be understood as that a time point of generating the Vsync valid signal is moved toward a direction closer to an origin of a time axis, and that the phase of the Vsync signal is moved backward may be understood as that the time point of generating the Vsync valid signal is moved towards a direction away from the origin of the time axis.

For example, when the phase of the Vsync signal at the destination end is moved, the phase of the Vsync signal at the destination end is moved only by one STEP each time, and the STEP is a smallest time unit by which a clock can be adjusted. For example, a smallest time unit by which the destination end device can be adjusted is 10 µs. Then, if TPhase3 is greater than TDelay3, the phase of the Vsync signal of the destination end device is moved forward by 10 µs; or if TPhase3 is less than TDelay3, the phase of the Vsync signal of the destination end device is moved backward by 10 s.

S8025: Determine whether a difference between TPhase3 and TDelay3 is less than a third preset threshold. If not, perform step S8021; if yes, end the adjustment.

In some embodiments, when the difference between TPhase3 and TDelay3 is greater than the third preset threshold, S8021 to S8024 are repeatedly performed to adjust the phase of the Vsync signal of the destination end device step by step. When TPhase3 is equal to TDelay3, it is equivalent to describing that the display waiting delay T6 is completely eliminated. In this case, it is considered that a phase of a Vsync signal of a source end device and the phase of the Vsync signal of the destination end device are synchronized. However, in an actual case, TPhase3 may not be completely equal to TDelay3. Alternatively, when the difference between TPhase3 and TDelay3 is less than the third preset threshold, or the difference between TPhase3 and TDelay3 is fixed within a specific difference interval, it may be considered that the phase of the Vsync signal of the source end device and the phase of the Vsync signal of the destination end device are basically synchronized.

In some embodiments, the destination end device adjusts the display Vsync signal of the destination end device step by step based on a relationship between the third time interval (T5+T6) between the time point at which decoding starts and the time point at which display starts and a third reference delay (T5) from the time point at which the destination end device starts decoding to the time point at which decoding is completed, so that the third time interval is equal to the third reference delay, or the difference between the third time interval and the third reference delay is fixed within a difference interval. In this way, the display waiting delay T6 is eliminated, and an end-to-end delay from the time point at which the source end device starts encoding to the time point at which the destination end device starts displaying is reduced.

In an optional case, after obtaining TPhase3 and TDelay3, the destination end device sends TPhase3 and TDelay3 to the source end device, and then adjusts the phase of the Vsync signal of the source end device. In this way, phase synchronization between the Vsync signal of the source end device and the Vsync signal of the destination end device is also implemented. In this case, if TPhase3 is greater than TDelay3, the phase of the Vsync signal of the source end device is moved backward; or if TPhase3 is less than TDelay3, the phase of the Vsync signal of the source end device is moved forward.

Figure 10:
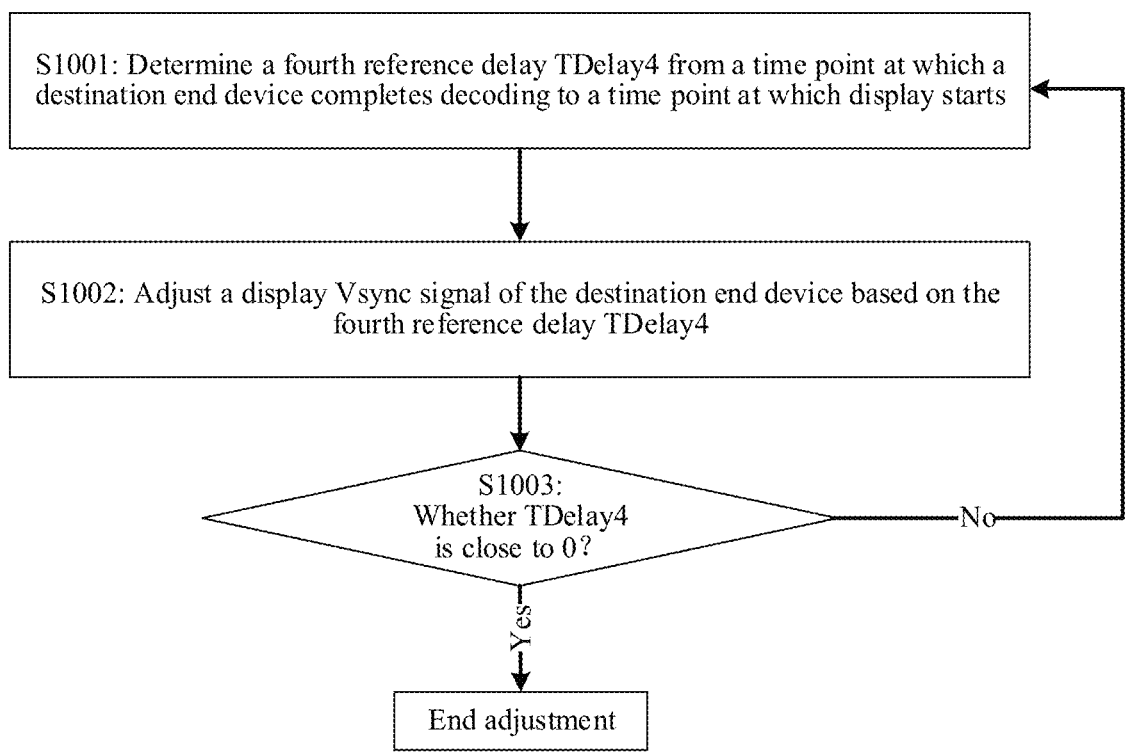
FIG. 10 is a flowchart of an example of a wireless projection method according to an embodiment of this application.

FIG. 10 shows another wireless projection method according to an embodiment of this application. In this embodiment, first time information indicates a fourth time point at which a destination end device completes decoding a first bitstream. The method includes the following steps.

S1001: Determine a fourth reference delay TDelay4 from the time point at which the destination end device completes decoding to a time point at which display starts.

In other words, obtaining the fourth reference delay includes:

S10011: Determine a time point Tdec at which the destination end device completes decoding.

S10012: Determine a time point TDisplay at which the destination end device starts displaying.

For example, the destination end device generates an interrupt when the Vsync valid signal for starting displaying occurs, and records a corresponding time point as TDisplay.

S10013: Calculate, based on Tdec and TDisplay, a sample value TDelay4Tmp of the fourth reference delay TDelay4 from the time point at which the destination end device completes decoding to the time point at which display starts.

For example, TDelay4Tmp may be calculated according to the following formula:

$$TDelay4Tmp = TDisplay - Tdec$$

S10014: Perform S10011 to S10013 cyclically to obtain a plurality of sample values of the fourth reference delay.

S10015: Stop the cycle after a quantity of sample values of the fourth reference delay reaches a sample threshold.

It should be understood that, as a quantity of times of cycles increases, obtained sample values of the fourth reference delay gradually converge. Therefore, to improve accuracy of the obtained fourth reference delay, the quantity of sample values of the fourth reference delay needs to be as large as possible, that is, the sample threshold needs to be as large as possible.

S10016: Determine the fourth reference delay TDelay4 from the plurality of sample values.

In an optional case, the plurality of sample values of the fourth reference delay are sorted, and a median value of the plurality of sample values is used as TDelay4, or a (sample value quantity×X %)$^{th}$ sample value from the beginning is used as TDelay4. For example, the total quantity of sample values of the first reference delay is 100, and X is 5. In this case, the 100 sample values are sorted in descending order, and the fifth sample value is used as TDelay4. It should be understood that, some extreme cases in which the fourth reference delay is excessively long due to an extreme environment of disturbance or extremely poor network may be excluded by flexibly setting X, and most cases are met at a far higher rate, for example, 90% to 99% cases are met. Therefore, when the sample values are sorted in descending order, a value of X is generally small, so that the obtained sample value is a large value in the plurality of sample values. It is clear that, the plurality of sample values of the fourth reference delay may alternatively be sorted in ascending order, and then a later sample value is used as TDelay4. In this case, the value of X is usually large.

S1002: Adjust a display Vsync signal of the destination end device based on the fourth reference delay TDelay4.

In an optional case, TDelay4 is compared with 0. If TDelay4 is greater than 0, the phase of the Vsync signal of the destination end device is adjusted, and the phase of the Vsync signal may be moved forward, or the phase of the Vsync signal may be moved backward.

In an optional case, the fourth reference delay TDelay4 is compared with TFrame/2. If TDelay4 is less than TFrame/2, a phase of the Vsync signal of the destination end device is moved forward; or if TDelay4 is greater than TFrame/2, the phase of the Vsync signal of the destination end device is moved backward. It should be understood that, TFrame is a time interval between displaying two adjacent frames. For example, when a display frame rate is 60 Hz, TFrame=1/60*1000 ms. When TDelay4 is less than TFrame/2, it indicates that when the phase of the Vsync signal of the destination end device is moved forward, TDelay4 can approach 0 as soon as possible; or when TDelay4 is greater than TFrame/2, it indicates that when the phase of the Vsync signal of the destination end device is moved backward, TDelay4 can approach 0 as soon as possible.

That the phase of the Vsync signal is moved forward may be understood as that a time point of generating the Vsync valid signal is moved toward a direction closer to an origin of a time axis, and that the phase of the Vsync signal is moved backward may be understood as that the time point of generating the Vsync valid signal is moved towards a direction away from the origin of the time axis. For example, when the phase of the Vsync signal at the destination end is moved, the phase of the Vsync signal at the destination end is moved only by one STEP each time, and the STEP is a smallest time unit by which a clock of the destination end device can be adjusted.

S1003: Determine whether TDelay4 is close to 0. If not, perform S1001; if yes, end the adjustment.

For example, whether TDelay4 is close to 0 may be determined based on whether a difference between TDelay4 and 0 is less than a preset threshold. When the difference between TDelay4 and 0 is less than the preset threshold, it is determined that TDelay4 is close to 0.

In some embodiments, the fourth reference delay between the time point at which decoding is completed and the time point at which display is started is obtained by using a phase convergence method. The display Vsync signal of the destination end device is adjusted step by step, and the fourth reference delay is gradually adjusted to 0 or infinitely close to 0, so that phases of Vsync signals of a source end device and the destination end device are basically synchronized. In this way, the display waiting delay T6 is eliminated, and the end-to-end delay from starting encoding by the source end device to starting displaying by the destination end device is reduced.

In an optional case, the destination end device may send TDelay4 to the source end device, and then adjusts the phase of the Vsync signal of the source end device. In this way, phase synchronization between the Vsync signal of the source end device and the Vsync signal of the destination end device is also implemented.

In the foregoing embodiments corresponding to FIG. 3 to FIG. 10, the display Vsync signal of the destination end device is adjusted step by step, so that phases of the Vsync signals of the destination end device and the source device are basically synchronized, and the display waiting delay T6 is basically eliminated. Further, a time required for decoding a frame of image is usually less than a time required for displaying a frame. For example, 10 milliseconds are required for decoding a frame of image, and 16 milliseconds are required for displaying a frame of image (when a display frame rate is 60 Hz). In addition, the image is displayed row by row. Therefore, in some embodiments, decoding and display may be further performed in parallel, to further basically eliminate the decoding delay T5 on a premise that the display waiting delay T6 is eliminated.

Figure 11A:
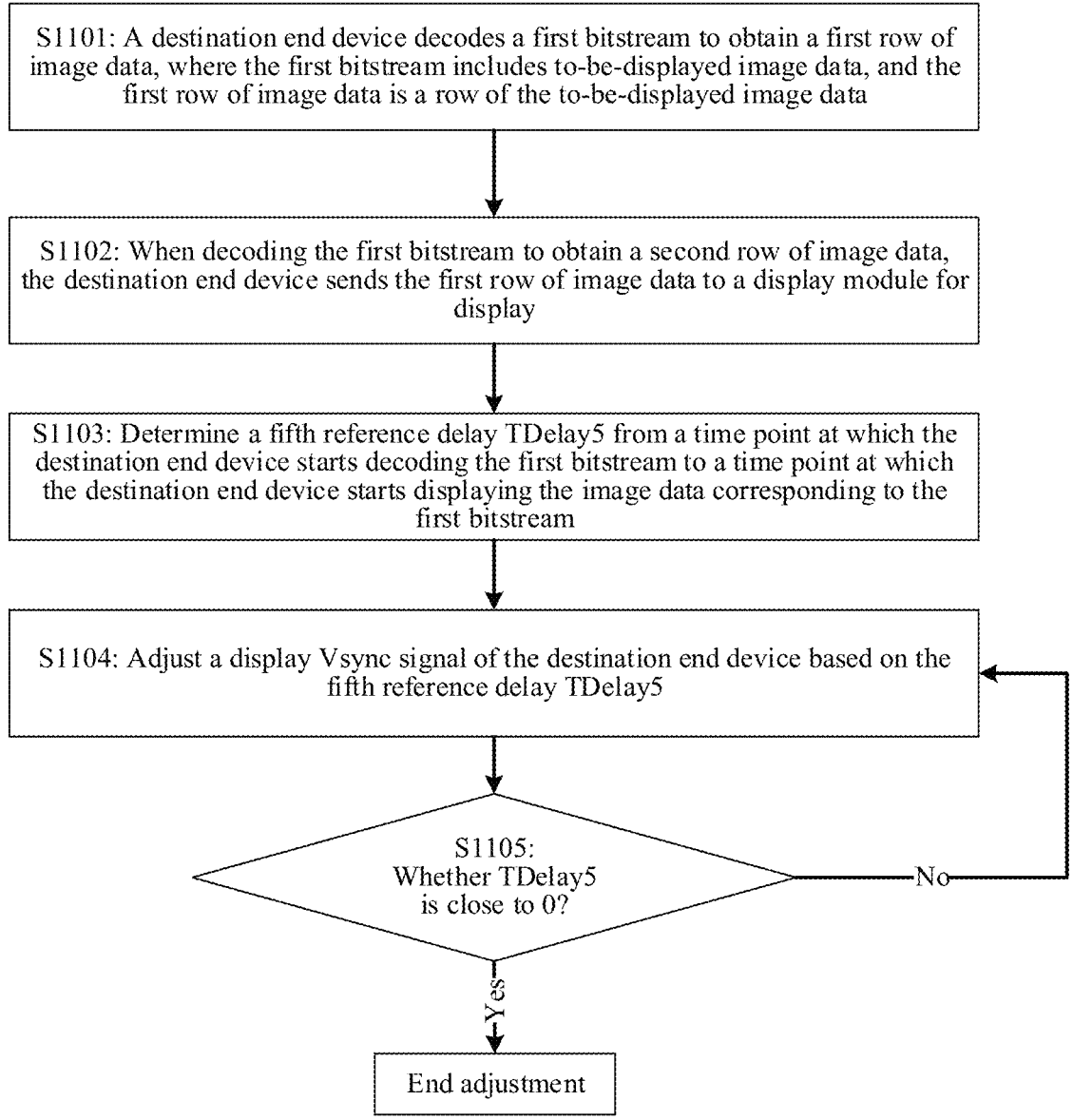
FIG. 11a is a flowchart of an example of a wireless projection method according to an embodiment of this application.
Figure 11B:
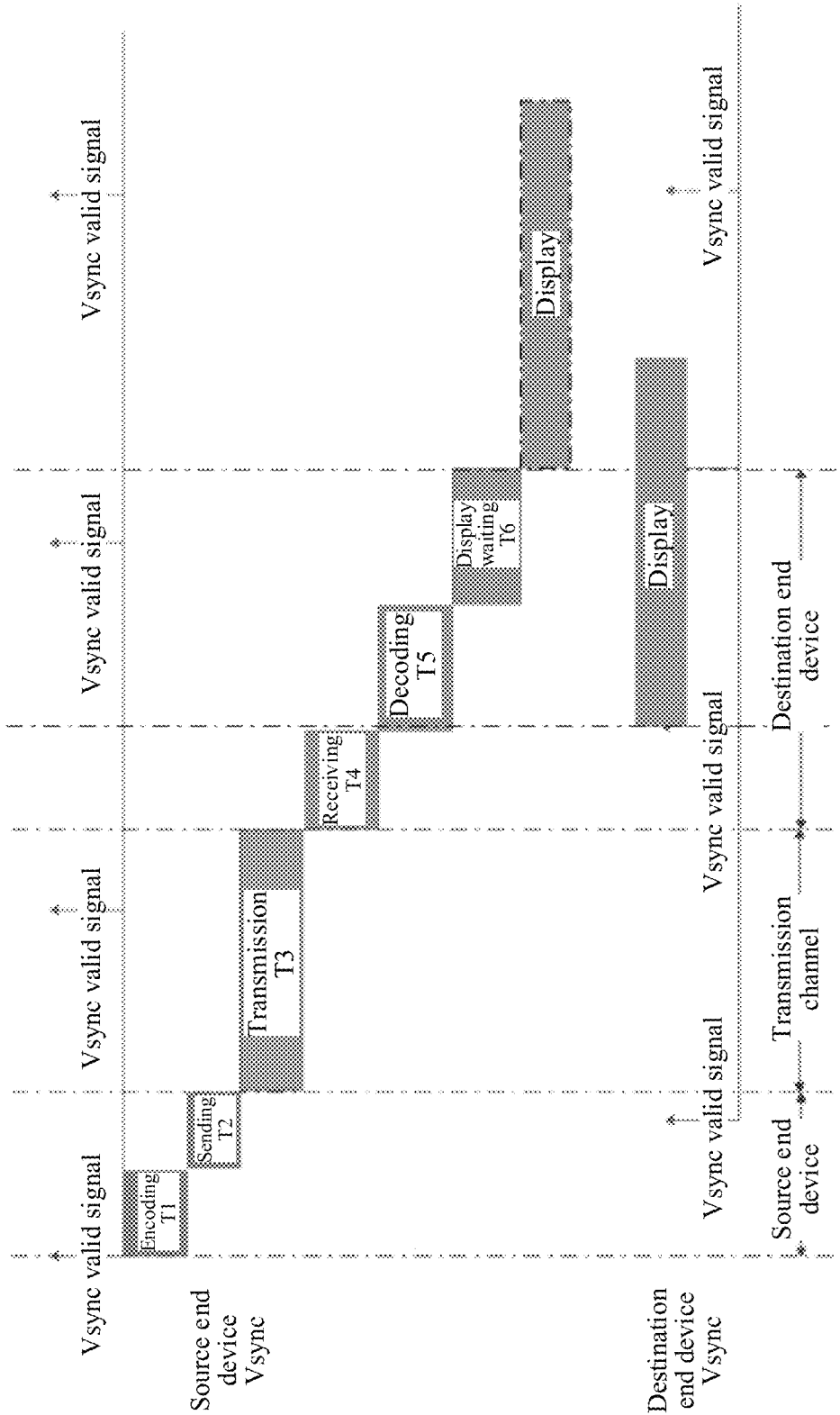
FIG. 11b is a schematic diagram of an end-to-end delay generated in a wireless projection process according to an embodiment of this application.

FIG. 11a shows another wireless projection method according to an embodiment of this application. FIG. 11b is a schematic diagram of an end-to-end delay after adjustment based on the method shown in FIG. 11a. In the method, when a row of images is obtained through decoding, the row of images is sent to a display module for display. The display does not need to be performed after all frames of image are decoded. In other words, decoding and display are performed in parallel. It can be learned from FIG. 11b that, according to the method shown in FIG. 11a, a decoding delay T5 and a display waiting delay T6 can be basically eliminated, and an end-to-end delay generated in a wireless projection process is reduced to T1+T2+T3+T4. In this embodiment, first time information indicates a third time point at which a destination end device starts decoding the first bitstream. The method includes the following steps.

S1101: The destination end device decodes a first bitstream to obtain a first row of image data, where the first bitstream includes to-be-displayed image data, and the first row of image data is a row of the to-be-displayed image data.

S1102: When decoding the first bitstream to obtain a second row of image data, the destination end device sends the first row of image data to a display module for display.

S1103: Determine a fifth reference delay TDelay5 from a time point at which the destination end device starts decoding the first bitstream to a time point at which the destination end device starts displaying the image data corresponding to the first bitstream.

In an optional case, the fifth reference delay TDelay5 is an empirical value.

Figure 12:
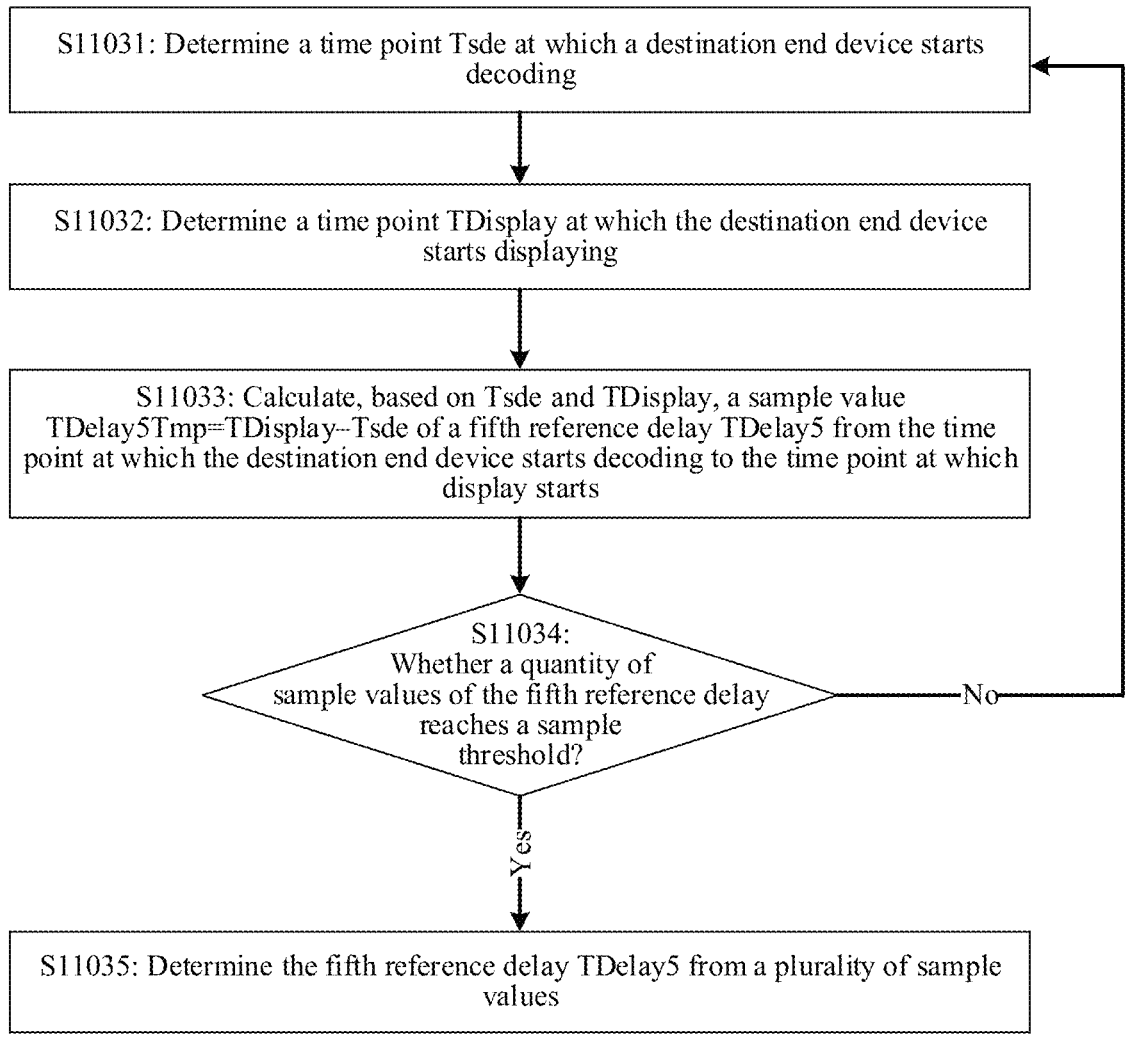
FIG. 12 is a flowchart of an example of a fifth reference delay obtaining method according to an embodiment of this application.

In another optional case, FIG. 12 is a flowchart of a method for determining the fifth reference delay according to an embodiment of this application. S1103 includes the following steps.

S11031: Determine a time point Tsde at which the destination end device starts decoding.

S11032: Determine a time point TDisplay at which the destination end device starts displaying.

For example, the destination end device generates an interrupt when the Vsync valid signal for starting displaying occurs, and records a corresponding time point as TDisplay.

S11033: Calculate, based on Tsde and TDisplay, a sample value TDelay5Tmp of the fifth reference delay TDelay5 from the time point at which the destination end device starts decoding to the time point at which display starts.

For example, TDelay5Tmp may be calculated according to the following formula:

$$TDelay5Tmp=TDisplay-Tsde$$

S11034: Determine whether a quantity of sample values of the fifth reference delay reaches a sample threshold. If yes, perform step S11035; if not, perform step S11031.

S11035: Determine the fifth reference delay TDelay5 from a plurality of sample values.

It should be understood that, as a quantity of times of cycles increases, obtained sample values of the fifth reference delay gradually converge. Therefore, to improve accuracy of the obtained fifth reference delay, the quantity of sample values of the fifth reference delay needs to be as large as possible, that is, the sample threshold needs to be as large as possible.

In an optional case, the plurality of sample values of the fifth reference delay are sorted, and a median value of the plurality of sample values is used as TDelay5, or a (sample value quantity×X %)$^{th}$ sample value from the beginning is used as TDelay5. It should be understood that, some extreme cases in which the first reference delay is excessively long due to an extreme environment of disturbance or extremely poor network may be excluded by flexibly setting X, and most cases are met at a far higher rate, for example, 90% to 99% cases are met. Therefore, when the sample values are sorted in descending order, a value of X is generally small, so that the obtained sample value is a large value in the plurality of sample values. For example, the total quantity of sample values of the first reference delay is 100, and X is 5. In this case, the 100 sample values are sorted in descending order, and the fifth sample value is used as TDelay5. It is clear that, the plurality of sample values of the fifth reference delay may alternatively be sorted in ascending order, and then a later sample value is used as TDelay5. In this case, the value of X is usually large.

S1104: Adjust a display Vsync signal of the destination end device based on the fifth reference delay TDelay5.

In an optional case, TDelay5 is compared with 0. If TDelay5 is greater than 0, the phase of the Vsync signal of the destination end device is adjusted, and the phase of the Vsync signal may be moved forward, or the phase of the Vsync signal may be moved backward. It should be understood that, in some cases, TDelay5 cannot be 0. Therefore, when TDelay5 is less than a preset threshold, the adjustment of the Vsync signal of the destination end device is stopped.

In an optional case, the fifth reference delay TDelay5 is compared with TFrame/2. If TDelay5 is less than TFrame/2, a phase of the Vsync signal of the destination end device is moved forward; or if TDelay5 is greater than TFrame/2, the phase of the Vsync signal of the destination end device is moved backward. It should be understood that, TFrame is a time interval between displaying two adjacent frames. For example, when a display frame rate is 60 Hz, TFrame=1/60*1000 ms. When TDelay5 is less than TFrame/2, it indicates that when the phase of the Vsync signal of the destination end device is moved forward, TDelay5 can approach 0 as soon as possible; or when TDelay5 is greater than TFrame/2, it indicates that when the phase of the Vsync signal of the destination end device is moved backward, TDelay5 can approach 0 as soon as possible.

That the phase of the Vsync signal is moved forward may be understood as that a time point of generating the Vsync valid signal is moved toward a direction closer to an origin of a time axis, and that the phase of the Vsync signal is moved backward may be understood as that the time point of generating the Vsync valid signal is moved towards a direction away from the origin of the time axis. For example, when the phase of the Vsync signal at the destination end is moved, the phase of the Vsync signal at the destination end is moved only by one STEP each time, and the STEP is a smallest time unit by which a clock of the destination end device can be adjusted.

S1105: Determine whether TDelay5 is close to 0. If not, perform S1104; if yes, end the adjustment.

For example, whether TDelay5 is close to 0 may be determined depending on whether a difference between TDelay5 and 0 is less than a preset threshold. When the difference between TDelay5 and 0 is less than the preset threshold, it is determined that TDelay5 is close to 0.

In some embodiments, phases of Vsync signals of a source end device and the destination end device are basically synchronized, so that the display waiting delay T6 can be eliminated. In addition, after a decoder decodes the first row of data, the display may display the first row of data. In addition, because time for the display to display the first row of data is longer than time for the decoder to decode the first row of data, when the display completes displaying the first row of data, the decoder has already decoded a second row of data. Therefore, in some embodiments, decoding and display may be further performed in parallel. In this way, the decoding delay T5 may further be basically eliminated. Therefore, in some embodiments, the fifth reference delay from the time point at which the destination end device starts decoding to the time point at which the destination end device starts displaying is obtained by using a phase convergence method, where the fifth reference delay includes the decoding delay T5 and the display waiting delay T6. The display Vsync signal of the destination end device is adjusted step by step, and the fifth reference delay is gradually adjusted to 0 or infinitely close to 0, so that display can be performed after decoding starts. In this way, the decoding delay T5 and the display waiting delay T6 are basically eliminated, the end-to-end delay generated in the wireless projection process is reduced to T1+T2+T3+T4, and the end-to-end delay from starting encoding by the source end device to starting displaying by the destination end device is reduced. It should be understood that, because only data that is successfully decoded can be displayed, time needed by the decoder to decode the first row of data cannot be eliminated.

Figure 13A:
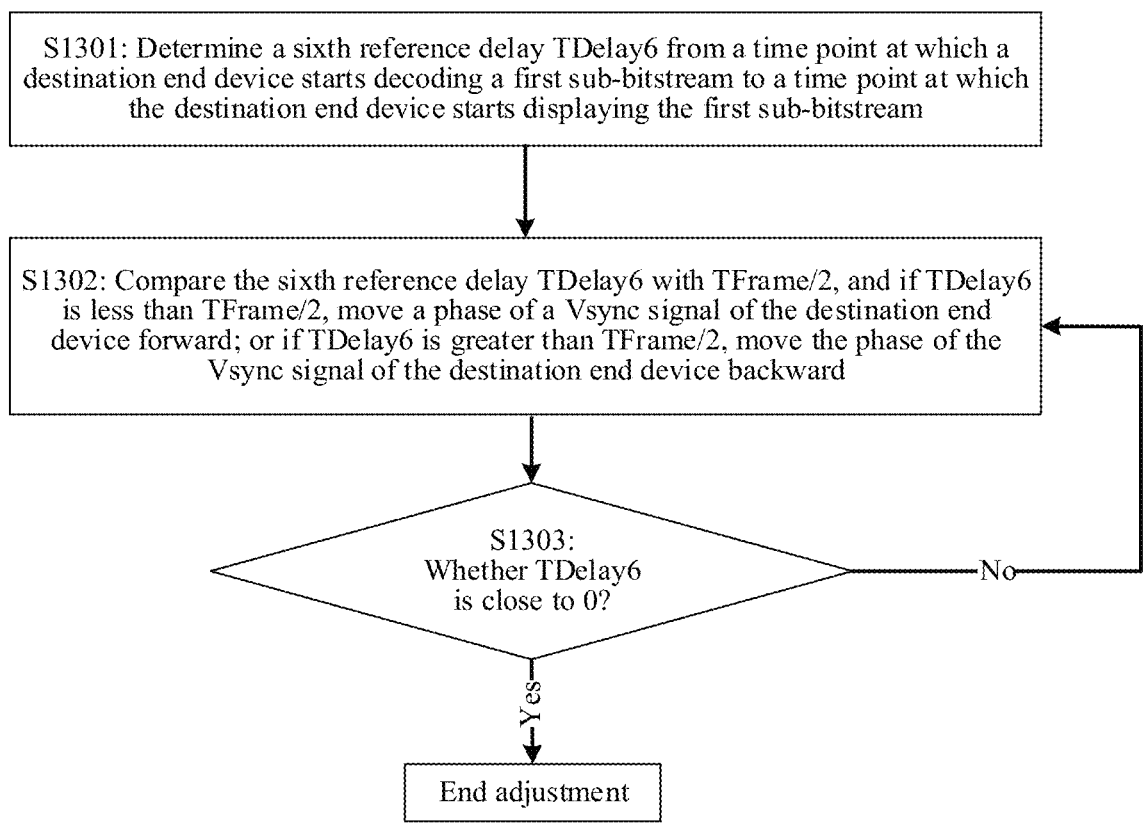
FIG. 13a is a flowchart of an example of a wireless projection method according to an embodiment of this application.

FIG. 13a shows another wireless projection method according to an embodiment of this application. In this embodiment, on a premise that decoding and display are performed in parallel, a frame of an image is further divided into a plurality of slices, and the plurality of slices are processed in parallel.

A destination end device receives and decodes a first bitstream, where the first bitstream is obtained by encoding a first slice in a frame of video data.

In a process of decoding the first bitstream, the destination end device receives a second bitstream from a source end device, where the second bitstream is obtained by encoding a second slice in the frame of video data, and the second slice is adjacent to the first slice.

The destination end device decodes the first bitstream to obtain a first row of image data of the first slice; and when decoding the first bitstream data to obtain a second row of image data of the first slice, sends the first row of image data of the first slice to a display for display.

The destination end device decodes the second bitstream to obtain a first row of image data of the second slice; and when decoding the second bitstream data to obtain a second row of image data of the second slice, sends the first row of image data of the second slice to the display for display.

In other words, in some embodiments, a plurality of slices are processed in parallel. The 2nd slice does not need to be processed after encoding, sending, transmission, receiving, decoding, and display of the 1st slice are all completed. Further, decoding and display of each slice are in parallel, that is, for each slice, a row of data is sent for display after decoding of the row of data is completed, and does not need to be sent for display after data of the entire slice is decoded. It should be understood that, if the source end device has only one encoder, the second slice can be encoded only after the first slice is encoded; or if the source end device has a plurality of encoders, the first slice and the second slice may be encoded in parallel.

Figure 13B:
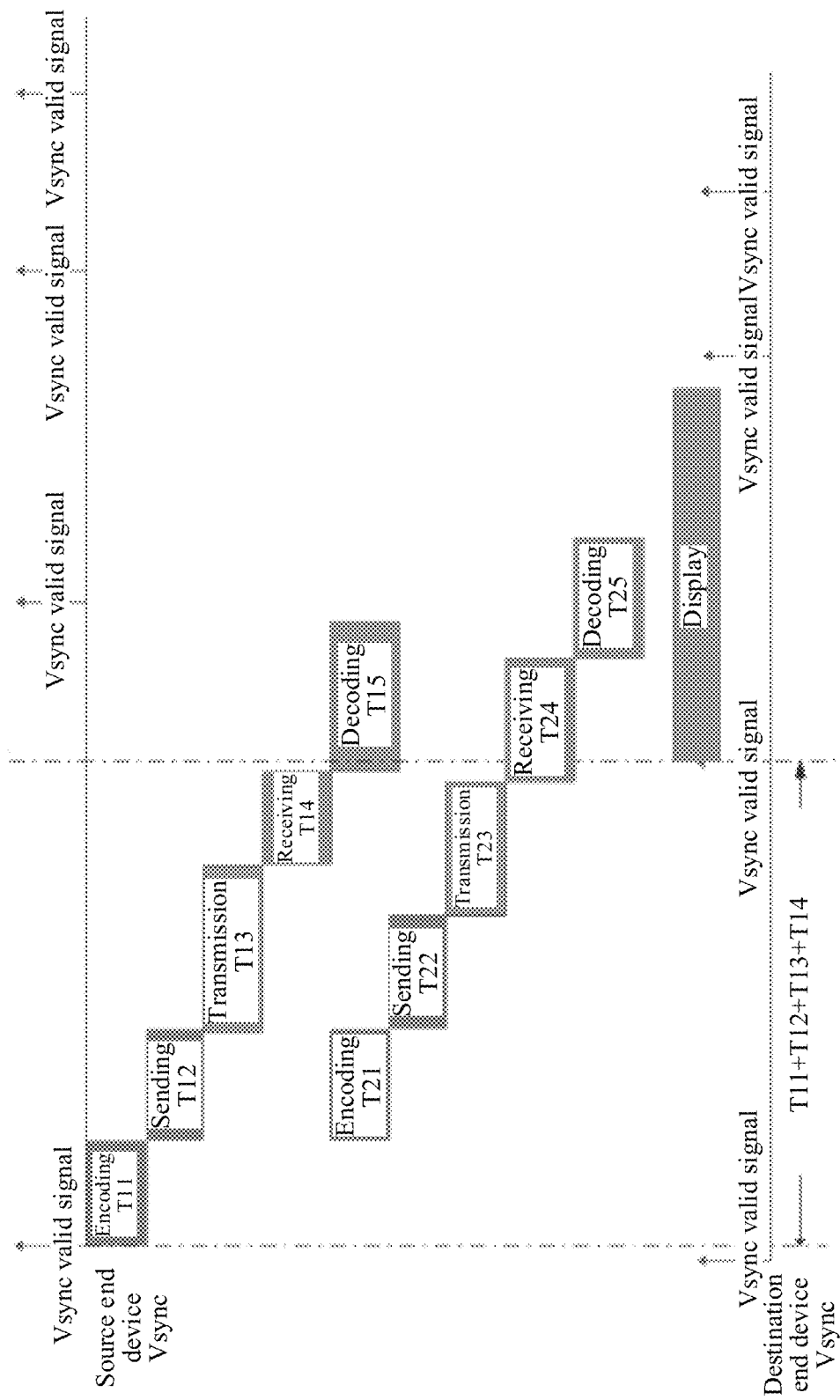
FIG. 13b is a schematic diagram of an end-to-end delay generated in a wireless projection process according to an embodiment of this application.

FIG. 13b is a schematic diagram of an end-to-end delay generated in a wireless projection process corresponding to the method in FIG. 13a. It can be learned from FIG. 13b that, the method shown in FIG. 13a can reduce the end-to-end delay generated in the wireless projection process to T11+T12+T13+T14, where T11 is an encoding delay generated when the 1st slice is encoded, T12 is a sending delay generated when the 1st slice is sent, T13 is a transmission delay generated when the 1st slice is transmitted, and T14 is a receiving delay generated when the 1st slice is received. In this embodiment, first time information indicates a third time point at which a destination end device starts decoding a first bitstream. The method shown in FIG. 13a includes the following steps.

S1301: Determine a sixth reference delay TDelay6 from a time point at which the destination end device starts decoding a first sub-bitstream to a time point at which the destination end device starts displaying the first sub-bitstream.

Optionally, the sixth reference delay is obtained based on sample statistics.

Specifically, a time point Tsde1 at which the destination end device starts decoding the first sub-bitstream is determined. When a Vsync valid signal that is of the destination end device that is displaying the first sub-bitstream, occurs, an interrupt is generated, and a corresponding time point is recorded as TDisplay. A time difference between Tsde1 and TDisplay is a sample value TDelay6Tmp of the sixth reference delay, that is, TDelay6Tmp=TDisplay−Tsde1.

A plurality of sample values of the sixth reference delay are repeatedly obtained.

The cycle stops when a quantity of sample values of the fourth reference delay reaches a sample threshold, and one of the plurality of sample values is selected as the sixth reference delay TDelay6.

It should be understood that, as a quantity of times of cycles increases, obtained sample values of the sixth reference delay gradually converge. Therefore, to improve accuracy of the obtained sixth reference delay, the quantity of sample values of the sixth reference delay needs to be as large as possible, that is, the sample threshold needs to be as large as possible.

In an optional case, a median value of the plurality of sample values may be used as TDelay6. Alternatively, the plurality of sample values of the sixth reference delay are sorted, and a (sample value quantity×X %)$^{th}$ sample value from the beginning is used as TDelay6. It should be understood that, some extreme cases in which the first reference delay is excessively long due to an extreme environment of disturbance or extremely poor network may be excluded by flexibly setting X, and most cases are met at a far higher rate, for example, 90% to 99% cases are met. Therefore, when the sample values are sorted in descending order, a value of X is generally small, so that the obtained sample value is a large value in the plurality of sample values. It is clear that, the plurality of sample values of the sixth reference delay may alternatively be sorted in ascending order, and then a later sample value is used as TDelay6. In this case, the value of X is usually large.

In an optional case, the sixth reference delay TDelay6 may alternatively be a preset empirical value. During wireless projection, the destination end device obtains the empirical value from a storage unit (e.g., storage circuit), to adjust a phase of the Vsync signal.

S1302: Compare the sixth reference delay TDelay6 with TFrame/2, and if TDelay6 is less than TFrame/2, move the phase of the Vsync signal of the destination end device forward; or if TDelay6 is greater than TFrame/2, move the phase of the Vsync signal of the destination end device backward.

It should be understood that, TFrame is a time interval between displaying two adjacent frames. For example, when a display frame rate is 60 Hz, TFrame=1/60*1000 ms. When TDelay6 is less than TFrame/2, it indicates that when the phase of the Vsync signal of the destination end device is moved forward, TDelay6 can approach 0 as soon as possible; or when TDelay6 is greater than TFrame/2, it indicates that when the phase of the Vsync signal of the destination end device is moved backward, TDelay6 can approach 0 as soon as possible.

In an optional case, TDelay6 is compared with 0. If TDelay6 is greater than 0, the phase of the Vsync signal of the destination end device is adjusted, and the phase of the Vsync signal may be moved forward, or the phase of the Vsync signal may be moved backward. It should be understood that, in some cases, TDelay6 cannot be 0. Therefore, when TDelay6 is less than a preset threshold, the adjustment of the Vsync signal of the destination end device is stopped.

S1303: Determine whether TDelay6 is close to 0. If not, perform S1302; if yes, end the adjustment.

For example, whether TDelay6 is close to 0 may be determined depending on whether a difference between TDelay6 and 0 is less than a preset threshold. When the difference between TDelay6 and 0 is less than the preset threshold, it is determined that TDelay6 is close to 0.

In some embodiments, one frame of image is divided into a plurality of slices, and the plurality of slices are processed in parallel. Further, the decoding and display of each slice are performed in parallel. By adjusting the phase of the display Vsync signal of the destination end device, the end-to-end delay generated in the wireless projection process can be reduced to T11+T12+T13+T14, where T11 is an encoding delay generated when the first slice is encoded, T12 is a sending delay generated when the first slice is sent, T13 is a transmission delay generated when the first slice is transmitted, and T14 is a receiving delay generated when the first slice is received. It can be learned that the end-to-end delay depends on a size of the 1st slice. On a premise that the size of the slice meets a specification in the standard, the size of the slice should be as small as possible.

It should be understood that, in the embodiments corresponding to FIG. 3 to FIG. 13b, phase synchronization between the Vsync signals of the source end device and the destination end device is implemented through adjustment of the Vsync signal of the destination end device. In an optional case, the reference delay and the time interval may further be sent to the source end device, and then, the phase of the Vsync signal of the source end device is adjusted. In this way, phase synchronization between the Vsync signals of the source end device and the destination end device is also implemented.

FIG. 14 shows a wireless projection method according to an embodiment of this application. The wireless projection method is applied to a source end device, and the method includes the following steps.

S1401: Send a first bitstream to a destination end device, where the first bitstream is obtained by encoding first video data.

S1402: Adjust a display Vsync signal of the source end device based on first time information, where the first time information indicates a first time point at which the source end device starts encoding the first bitstream, a second time point at which the destination end device starts receiving the first bitstream, a third time point at which the destination end device starts decoding the first bitstream, or a fourth time point at which the destination end device completes decoding the first bitstream.

In some embodiments, phase synchronization between the Vsync signal of the source end device and a Vsync signal of the destination end device is implemented through adjustment of the Vsync signal of the source end device.

In a possible implementation, the first time information indicates the first time point at which the source end device starts encoding the first bitstream. The method further includes: recording the first time point at which encoding of the first bitstream starts; and the adjusting the display of the Vsync signal of the source end device based on the first time information includes: obtaining a first reference delay, where the first reference delay is a reference delay between the first time point and a time point at which the destination end device completes decoding the first bitstream; obtaining a first time interval, where the first time interval is a delay between the first time point and a time point at which the destination end device starts displaying the first video data; and adjusting the display Vsync signal of the source end device until a difference between the first reference delay and the first time interval is less than a first preset threshold.

In a possible implementation, the first reference delay is received from the destination end device, or the first reference delay is obtained by the source end device through calculation.

In a possible implementation, the adjusting of the display Vsync signal of the source end device until a difference between the first reference delay and the first time interval is less than a first preset threshold includes: when the first time interval is greater than the first reference delay, moving a phase of the display Vsync signal of the source end device backward by one time step, where the time step is a smallest time unit by which a clock of the source end device can be adjusted; when the first time interval is less than the first reference delay, moving a phase of the display Vsync signal of the source end device forward by one time step; or when the difference between the first reference delay and the first time interval is less than the first preset threshold, stopping the adjustment of the display Vsync signal of the source end device.

In a possible implementation, the first time information indicates the second time point at which the destination end device starts receiving the first bitstream; and the adjusting the display of the Vsync signal of the source end device based on the first time information includes: obtaining a second reference delay, where the second reference delay is a reference delay between the second time point and a time point at which the destination end device completes decoding; obtaining a second time interval, where the second time interval is a delay between the second time point and a time point at which the destination end device starts displaying the first video data; and adjusting the display Vsync signal of the source end device until a difference between the second reference delay and the second time interval is less than a second preset threshold.

In a possible implementation, the first time information indicates the third time point at which the destination end device starts decoding the first bitstream; and the adjusting a display Vsync signal of the source end device based on the first time information includes: obtaining a third reference delay, where the third reference delay is a reference delay between the third time point and a time point at which the destination end device completes decoding the first bitstream; obtaining a third time interval, where the third time interval is a delay between the third time point and a time point at which the destination end device starts displaying the first video data; and adjusting the display Vsync signal of the source end device until a difference between the third reference delay and the third time interval is less than a third preset threshold.

In a possible implementation, the first time information indicates the fourth time point at which the destination end device completes decoding the first bitstream; and the adjusting the display of the Vsync signal of the source end device based on the first time information includes: obtaining a fourth reference delay, where the fourth reference delay is a reference delay between the fourth time point and a time point at which the destination end device starts displaying the first video data; and adjusting the display of the Vsync signal of the source end device until the fourth reference delay is less than a fourth preset threshold.

In a possible implementation, the adjustment of the display Vsync signal of the source end device until the fourth reference delay is less than a fourth preset threshold includes: when the fourth reference delay is less than TFrame/2, moving a phase of the display Vsync signal of the source end device backward by one time step, where the time step is a smallest time unit by which a clock of the source end device can be adjusted, and TFrame is a time interval between two adjacent frames displayed by the destination end device; when the fourth reference delay is greater than TFrame/2, moving a phase of the display Vsync signal of the source end device forward by one time step; or when the fourth reference delay is less than the fourth preset threshold, stopping the adjustment of the display Vsync signal of the source end device.

In a possible implementation, the first time information indicates the third time point at which the destination end device starts decoding the first bitstream; and the adjusting the display of the Vsync signal of the destination end device based on the first time information includes: obtaining a fifth reference delay, where the fifth reference delay is a reference delay between the third time point and a time point at which the destination end device starts displaying the first video data; and adjusting the display Vsync signal of the source end device until the fifth reference delay is less than a fifth preset threshold.

In a possible implementation, the first video data is a first slice in a frame of video data, and when sending a first bitstream to a destination end device, the method further includes: encoding a second slice in the frame of video data to obtain a second bitstream, where the second slice is adjacent to the first slice; the first time information indicates the third time point at which the destination end device starts decoding the first bitstream; and the adjusting the display of the Vsync signal of the destination end device based on the first time information includes: obtaining a sixth reference delay, where the sixth reference delay is a reference delay between the third time point and a time point at which the destination end device starts displaying the first row of image data of the first slice; and adjusting the display Vsync signal of the source end device until the sixth reference delay is less than a sixth preset threshold.

FIG. 15 is a schematic diagram of an architecture of an example of a terminal 100 according to an embodiment of this application. It should be understood that the terminal 100 may be the foregoing source end device or destination end device. The terminal 100 may include an antenna system 110, a radio frequency (RF) circuit 120, a processor 130, a memory 140, a camera 150, an audio circuit 160, a display screen 170, one or more sensors 180, a wireless transceiver 190, and the like.

The antenna system 110 may be one or more antennas, or may be an antenna array including a plurality of antennas. The radio frequency circuit 120 may include one or more analog radio frequency transceivers. The radio frequency circuit 120 may further include one or more digital radio frequency transceivers. The RF circuit 120 is coupled to the antenna system 110. It should be understood that, in embodiments of this application, coupling refers to a mutual connection in a specific manner, including a direct connection or an indirect connection by using another device, for example, a connection by using various interfaces, transmission lines, or buses. The radio frequency circuit 120 may be used for various types of cellular wireless communication.

The processor 130 may include a communication processor. The communication processor may be configured to control the RF circuit 120 to receive and send a signal by using the antenna system 110. The signal may be a voice signal, a media signal, or a control signal. The processor 130 may include various general-purpose processing devices, for example, may be a general-purpose central processing unit (CPU), a system on chip (SOC), a processor integrated on an SOC, an independent processor chip, or a controller. The processor 130 may further include a dedicated processing device, for example, an application-specific integrated circuit (ASIC), a field programmable gate array (FPGA), a digital signal processor (DSP), a dedicated video or graphics processor, a graphics processing unit (GPU), or a neural network processing unit (NPU). The processor 130 may be a processor group including a plurality of processors, and the plurality of processors are coupled to each other through one or more buses. The processor may include an analog-to-digital converter (ADC) and a digital-to-analog converter (DAC), to implement signal connection between different components of the apparatus. The processor 130 is configured to invoke program instructions stored in the memory 140, to implement some or all steps in any one of the method embodiments shown in FIG. 3 to FIG. 14.

The memory 140 is coupled to the processor 130. The memory 140 may be coupled to the processor 130 by using one or more memory controllers. The memory 140 may be configured to store computer program instructions, including a computer operating system (OS) and various user application programs. The memory 140 may be further configured to store user data, for example, graphics and image data, video data, audio data, calendar information, contact information, or another media file that is obtained by rendering an application program. The processor 130 may read the computer program instructions or the user data from the memory 140, or store computer program instructions or user data into the memory 140, to implement a related processing function. The memory 140 may be a non-volatile memory, for example, an eMMC (multimedia card), a UFS (universal flash storage), or a read-only memory (ROM), or another type of static storage device that can store static information and instructions, or may be a volatile memory, for example, a random access memory (RAM), a static random access memory (SRAM), or another type of dynamic storage device that can store information and instructions. The memory 140 may alternatively be an electrically erasable programmable read-only memory (EEPROM), a compact disc read-only memory (CD-ROM), or another optical disc memory, an optical disc memory (including a compact disc, a laser disc, a digital versatile disc, a Blu-ray disc, or the like), a magnetic disk storage medium, or another magnetic storage device, but is not limited thereto. Optionally, the memory 140 may be independent of the processor 130, or may be integrated with the processor 130.

The camera 150 is configured to collect an image or a video. For example, a user may trigger, by using application program instructions, to turn on the camera 150, to implement a shooting function or a photographing function, for example, to shoot and obtain a picture or a video of any scene. The camera may include components such as a lens, a light filter, and an image sensor. The camera may be located in the front of a terminal device, or may be located on the back of the terminal device. A specific quantity and arrangement manner of cameras may be flexibly determined based on a requirement of a designer or a vendor policy. This is not limited in this application.

The audio circuit 160 is coupled to the processor 130. The audio circuit 160 may include a microphone 161 and a loudspeaker 162. The microphone 161 may receive sound input from the outside, and the loudspeaker 162 may play audio data. It should be understood that, the terminal 100 may have one or more microphones and one or more headsets. A quantity of the microphones and a quantity of the headsets are not limited in some embodiments.

The display screen 170 is configured to provide a user with various display interfaces or various menu information that can be selected. For example, content displayed by the display screen 170 includes, but is not limited to, a soft keyboard, a virtual mouse, a virtual key, and an icon. The displayed content is associated with an internal module or function. The display screen 170 may further receive user input. Optionally, the display screen 170 may further display information entered by the user, for example, receive control information such as enabling or disabling. For example, after the terminal verifies that a smart device is valid, the terminal may display information such as a device identification (ID), a device type, and a corresponding icon that are of the smart device on the display screen 170. An association result, a network connection result, and a registration result that are returned by the smart device may also be displayed on the display screen 170. The display screen 170 may include a display panel 171 and a touch panel 172. The display panel 171 may be configured by using a liquid crystal display (LCD), an organic light-emitting diode (OLED), a light emitting diode (LED) display device, a cathode ray tube (CRT), or the like. The touch panel 172, also referred to as a touchscreen, a touch-sensitive screen, or the like, may collect a touch operation or a non-touch operation of a user on or near the touch panel 172 (such as an operation of the user on or near the touch panel 172 by using any suitable object or attachment such as a finger or a touch pen, where the operation may also include a motion sensing operation, and includes a single-point control operation, a multi-point control operation, and the like), and drive a corresponding connection apparatus according to a preset program. Optionally, the touch panel 172 may include two parts: a touch detection apparatus and a touch controller. The touch detection apparatus detects a signal generated by the touch operation of the user, and transmits the signal to the touch controller. The touch controller receives touch information from the touch detection apparatus, converts the touch information into information that can be processed by the processor 130, then sends the touch information to the processor 130, and can receive a command sent by the processor 130 and execute the command. Further, the touch panel 172 may cover the display panel 171. The user may perform an operation on or near the touch panel 172 based on content displayed on the display panel 171. After detecting the operation, the touch panel 172 transmits the operation to the processor 130 by using an input/output (I/O) subsystem 10, to determine user input. Then, the processor 130 provides corresponding visual output on the display panel 171 by using the I/O subsystem 10 based on the user input. Although, in FIG. 1, the touch panel 172 and the display panel 171 are used as two independent components to implement input and output functions of the terminal 100, in some embodiments, the touch panel 172 and the display panel 171 are integrated together.

The sensor 180 may include an image sensor, a motion sensor, a proximity sensor, an ambient noise sensor, a sound sensor, an accelerometer, a temperature sensor, a gyroscope, or another type of sensor, and a combination of various forms thereof. The processor 130 drives, by using a sensor controller 12 in the I/O subsystem 10, the sensor 180 to receive various information such as audio information, image information, or motion information. The sensor 180 transmits the received information to the processor 130 for processing.

The wireless transceiver 190 may provide a wireless connection capability for another device, and the another device may be a peripheral device such as a wireless headset, a Bluetooth headset, a wireless mouse, or a wireless keyboard, or may be a wireless network, for example, a Wi-Fi network, a wireless personal area network (WPAN), or a WLAN thereof. The wireless transceiver 190 may be a Bluetooth-compatible transceiver, and is configured to wirelessly couple the processor 130 to a peripheral device such as a Bluetooth headset or a wireless mouse. The wireless transceiver 190 may also be a Wi-Fi-compatible transceiver, and is configured to wirelessly couple the processor 130 to a wireless network or another device.

The terminal 100 may further include another input device 14 that is coupled to the processor 130 to receive various user inputs, for example, receive an input number, name, address, and media selection. The another input device 14 may include a keyboard, a physical button (a press button, a rocker button, or the like), a dial pad, a slider switch, a joystick, a click wheel, an optical mouse (where the optical mouse is a touch-sensitive surface that does not display visual output, or is an extension of a touch-sensitive surface formed by a touchscreen), and the like.

The terminal 100 may further include the foregoing I/O subsystem 10. The I/O subsystem 10 may include another input device controller 11 configured to receive a signal from the another input device 14 or send control or drive information of the processor 130 to the another input device 190. The I/O subsystem 10 may further include the foregoing sensor controller 12 and display controller 13, which are respectively configured to implement data and control information exchange between the sensor 180 and the display screen 170 and the processor 130.

The terminal 100 may further include a power supply 101, to supply power to other components that include 110 to 190 and that are of the terminal 100. The power supply may be a rechargeable or non-rechargeable lithium-ion battery or a nickel metal hydride battery. Further, when the power supply 101 is a rechargeable battery, the power supply 101 may be coupled to the processor 130 by using a power management system, so that the power management system can manage charging, discharging, power consumption adjustment, and the like.

It should be understood that the terminal 100 in FIG. 15 is merely an example, and does not constitute a limitation on a form of the terminal 100. The terminal 100 may further include another existing component that is not shown in FIG. 15 or a component that may be added in the future.

In an optional solution, all or some of the RF circuit 120, the processor 130, and the memory 140 may be integrated into one chip, or may be chips independent of each other. The RF circuit 120, the processor 130, and the memory 140 may include one or more integrated circuits disposed on a printed circuit board (PCB).

Figure 16:
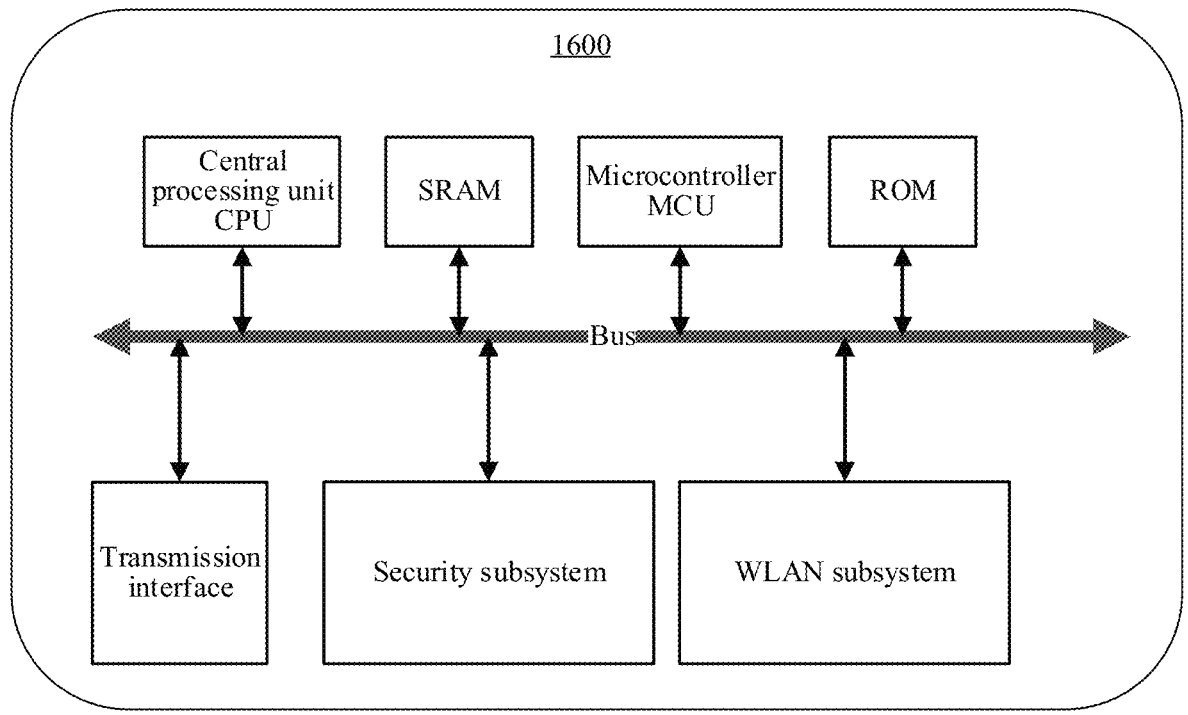
FIG. 16 is a diagram of an example of a hardware architecture of a projection apparatus according to an embodiment of this application.

FIG. 16 is a diagram of a hardware architecture of an example of a projection apparatus according to an embodiment of this application. The projection apparatus 1600 may be, for example, the foregoing source end device or destination end device. In this case, the foregoing source end device and destination end device are processor chips in an entire system. For example, the source end device is a processor chip in a projection source device, and the destination end device is a processor chip in a display device.

Refer to FIG. 16. The apparatus 1600 includes at least one CPU and a memory. A type of the memory may include, for example, an SRAM and a ROM, a microcontroller (MCU), a security subsystem, a WLAN subsystem, a bus, a transmission interface, and the like. The apparatus 700 may further include other dedicated processors such as an application processor (AP) and an NPU, and other subsystems such as a power management subsystem, a clock management subsystem, and a power consumption management subsystem, although they are not shown in FIG. 16.

The foregoing parts of the apparatus 1600 are coupled by using a connector. For example, the connector includes various interfaces, transmission lines, buses, or the like. These interfaces are usually electrical communication interfaces, but may also be mechanical interfaces or interfaces in another form. This is not limited in this embodiment.

Optionally, the CPU may be a single-core processor (single-CPU) or a multi-core processor (multi-CPU). Optionally, the CPU may be a processor group including a plurality of processors, and the plurality of processors are coupled to each other by using one or more buses. In an optional case, the CPU implements any wireless projection method in the foregoing method embodiments by invoking program instructions stored in an on-chip memory or an off-chip memory. In an optional case, the CPU and the MCU jointly implement any wireless projection method in the foregoing method embodiments. For example, the CPU completes some steps in the wireless projection method, and the MCU completes other steps in the wireless projection method. In an optional case, the AP or another dedicated processor implements any wireless projection method in the foregoing method embodiments by invoking program instructions stored in an on-chip memory or an off-chip memory.

The transmission interface may be an interface of the processor chip for receiving and sending data. The transmission interface usually includes a plurality of interfaces. In an optional case, the transmission interface may include an inter-integrated circuit (I2C) interface, a serial peripheral interface (SPI), a universal asynchronous receiver/transmitter (UART) interface, a general-purpose input/output (GPIO) interface, and the like. It should be understood that these interfaces may implement different functions by multiplexing a same physical interface.

In an optional case, the transmission interface may further include a high definition multimedia interface (HDMI), a V-By-One interface, an embedded display port (eDP), a mobile industry processor interface (MIPI), a Display Port (DP), or the like.

In an optional case, the foregoing parts are integrated into a same chip. In another optional case, the memory may be an independent chip.

The security subsystem may be configured to implement a related security-authenticated encryption algorithm. It should be understood that the related security-authenticated encryption algorithm is usually implemented by hardware, so that security of the encryption algorithm can be further improved.

The WLAN subsystem may include, for example, an RF circuit and a baseband.

A chip in embodiments of this application is a system manufactured on a same semiconductor substrate by using an integrated circuit process, and is also referred to as a semiconductor chip. The chip may be a set of integrated circuits formed on the substrate (which is usually a semiconductor material such as silicon) by using the integrated circuit process, and an outer layer of the chip is usually packaged with a semiconductor packaging material. The integrated circuit may include various types of functional devices. Each type of functional device includes a logic gate circuit, a metal-oxide-semiconductor (MOS) transistor, a bipolar transistor, a diode, or another transistor, or may include another component such as a capacitor, a resistor, or an inductor. Each functional device may work independently or work under an action of necessary drive software, and may implement various functions such as communication, calculation, or storage.

Figure 17:
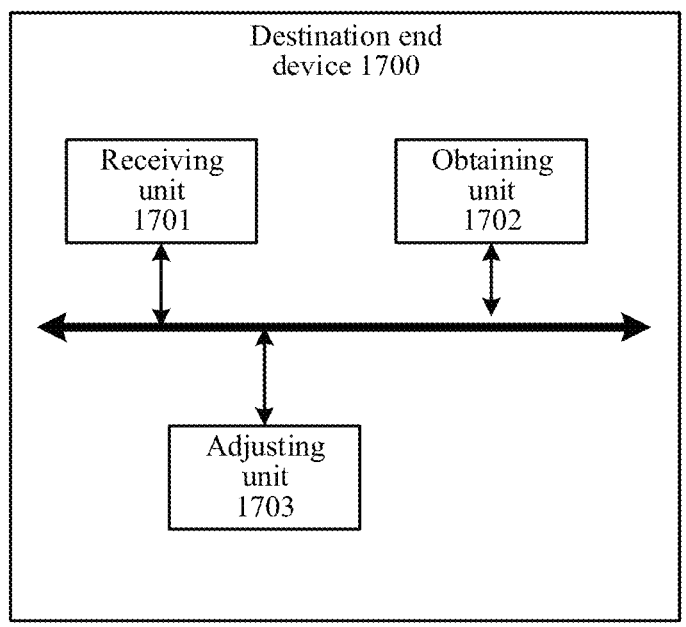
FIG. 17 is a schematic diagram of a structure of an example of a destination end device according to an embodiment of this application.

FIG. 17 shows a destination end device 1700 according to an embodiment of this application. The destination end device 1700 includes a receiving unit 1701 (e.g., receiving circuit), an obtaining unit 1702 (e.g., obtaining circuit), and an adjusting unit 1703 (e.g., adjusting circuit). The receiving unit 1701 is configured to implement step S001 in the foregoing method embodiment, the obtaining unit 1702 is configured to implement step S002 in the foregoing method embodiment, the adjusting unit 1703 is configured to implement step S003 in the foregoing method embodiment, and the adjusting unit 1703 is further configured to implement the method embodiments corresponding to FIG. 4a to FIG. 13a.

In a possible implementation, the first time information indicates the first time point at which the source end device starts encoding the first bitstream; and the obtaining unit 1702 is configured to: extract the first time point from the first bitstream; and the adjusting unit 1703 is configured to: obtain a first reference delay, where the first reference delay is a reference delay between the first time point and a time point at which the destination end device completes decoding the first bitstream; obtain a first time interval, where the first time interval is a delay between the first time point and a time point at which the destination end device starts displaying the first video data; and adjust the display Vsync signal of the destination end device until a difference between the first reference delay and the first time interval is less than a first preset threshold.

In a possible implementation, the first time information indicates the second time point at which the destination end device starts receiving the first bitstream; the obtaining unit 1702 is configured to: record the second time point at which the receiving unit receives the first bitstream; and the adjusting unit 1703 is configured to: obtain a second reference delay, where the second reference delay is a reference delay between the second time point and a time point at which the destination end device completes decoding; obtain a second time interval, where the second time interval is a delay between the second time point and a time point at which the destination end device starts displaying the first video data; and adjust the display Vsync signal of the destination end device until a difference between the second reference delay and the second time interval is less than a second preset threshold.

In a possible implementation, the first time information indicates the third time point at which the destination end device starts decoding the first bitstream; the obtaining unit 1702 is configured to: obtain the third time point from a decoder side of the destination end device; and the adjusting unit 1703 is configured to: obtain a third reference delay, where the third reference delay is a reference delay between the third time point and a time point at which the destination end device completes decoding the first bitstream; obtain a third time interval, where the third time interval is a delay between the third time point and a time point at which the destination end device starts displaying the first video data; and adjust the display Vsync signal of the destination end device until a difference between the third reference delay and the third time interval is less than a third preset threshold.

In a possible implementation, the first time information indicates the fourth time point at which the destination end device completes decoding the first bitstream; the obtaining unit 1702 is configured to: obtain the fourth time point from a decoder side of the destination end device; and the adjusting unit 1703 is configured to: obtain a fourth reference delay, where the fourth reference delay is a reference delay between the fourth time point and a time point at which the destination end device starts displaying the first video data; and adjust the display Vsync signal of the destination end device until the fourth reference delay is less than a fourth preset threshold.

In a possible implementation, the destination end device further includes: a decoding unit (e.g., decoding circuit) (not shown in FIG. 17), configured to: decode the first bitstream to obtain a first row of image data, where the first row of image data is a row of the first video data; and when decoding the first bitstream data to obtain a second row of image data, send the first row of image data to a display for display, where the first time information indicates the third time point at which the destination end device starts decoding the first bitstream; and the adjusting unit 1703 is configured to: obtain a fifth reference delay, where the fifth reference delay is a reference delay between the third time point and a time point at which the destination end device starts displaying the first video data; and adjust the display Vsync signal of the destination end device until the fifth reference delay is less than a fifth preset threshold.

In a possible implementation, the first video data is a first slice in a frame of video data, and the first time information indicates the third time point at which the destination end device starts decoding the first bitstream; and the adjusting unit 1703 is configured to: obtain a sixth reference delay, where the sixth reference delay is a reference delay between the third time point and a time point at which the destination end device starts displaying the first row of image data of the first slice; and adjust the display Vsync signal of the destination end device until the sixth reference delay is less than a sixth preset threshold.

Figure 18:
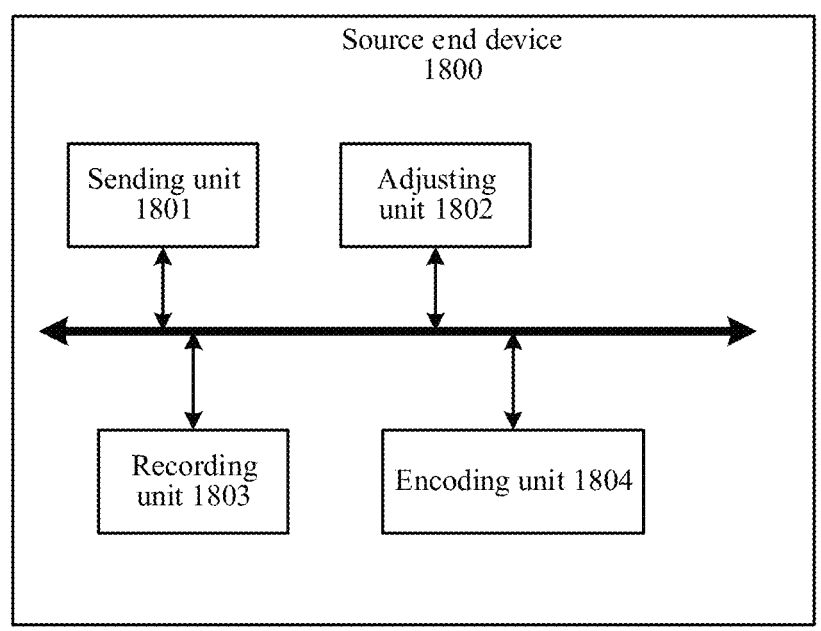
FIG. 18 is a schematic diagram of a structure of an example of a source end device according to an embodiment of this application.

FIG. 18 shows a source end device 1800 according to an embodiment of this application. The source end device 1800 includes a sending unit 1801 (e.g., sending circuit), an adjusting unit 1802 (e.g., adjusting circuit), a recording unit 1803 (e.g., recording circuit), and an encoding unit 1804 (e.g., encoding circuit). The receiving unit 1801 is configured to implement step S1401 in the foregoing method embodiment, the adjusting unit 1802 is configured to implement S1402 in the foregoing method embodiment, and when a destination end device sends a reference delay and a time interval to the source end device, the adjusting unit 1802 is further configured to implement the method embodiments corresponding to FIG. 4a to FIG. 13a.

In a possible implementation, the first time information indicates the first time point at which the source end device starts encoding the first bitstream; the recording unit 1803 is configured to record the first time point at which encoding of the first bitstream starts; and the adjusting unit 1802 is configured to: obtain a first reference delay, where the first reference delay is a reference delay between the first time point and a time point at which the destination end device completes decoding the first bitstream; obtain a first time interval, where the first time interval is a delay between the first time point and a time point at which the destination end device starts displaying the first video data; and adjust the display Vsync signal of the source end device until a difference between the first reference delay and the first time interval is less than a first preset threshold.

In a possible implementation, the first time information indicates the second time point at which the destination end device starts receiving the first bitstream; and the adjusting unit 1802 is configured to: obtain a second reference delay, where the second reference delay is a reference delay between the second time point and a time point at which the destination end device completes decoding; obtain a second time interval, where the second time interval is a delay between the second time point and a time point at which the destination end device starts displaying the first video data; and adjust the display Vsync signal of the source end device until a difference between the second reference delay and the second time interval is less than a second preset threshold.

In a possible implementation, the first time information indicates the third time point at which the destination end device starts decoding the first bitstream; and the adjusting unit 1802 is configured to: obtain a third reference delay, where the third reference delay is a reference delay between the third time point and a time point at which the destination end device completes decoding the first bitstream; obtain a third time interval, where the third time interval is a delay between the third time point and a time point at which the destination end device starts displaying the first video data; and adjust the display Vsync signal of the source end device until a difference between the third reference delay and the third time interval is less than a third preset threshold.

In a possible implementation, the first time information indicates the fourth time point at which the destination end device completes decoding the first bitstream; and the adjusting unit 1802 is configured to: obtain a fourth reference delay, where the fourth reference delay is a reference delay between the fourth time point and a time point at which the destination end device starts displaying the first video data; and adjust the display Vsync signal of the source end device until the fourth reference delay is less than a fourth preset threshold.

In a possible implementation, the first time information indicates the third time point at which the destination end device starts decoding the first bitstream; and the adjusting unit 1802 is configured to: obtain a fifth reference delay, where the fifth reference delay is a reference delay between the third time point and a time point at which the destination end device starts displaying the first video data; and adjust the display Vsync signal of the source end device until the fifth reference delay is less than a fifth preset threshold.

In a possible implementation, the source end device further includes an encoding unit 1804 (e.g., encoding circuit), the first video data is a first slice in a frame of video data, and when the sending unit sends the first bitstream to the destination end device, the encoding module is configured to: encode a second slice in the frame of video data to obtain a second bitstream, where the second slice is adjacent to the first slice; the first time information indicates the third time point at which the destination end device starts decoding the first bitstream; and the adjusting unit 1802 is configured to: obtain a sixth reference delay, where the sixth reference delay is a reference delay between the third time point and a time point at which the destination end device starts displaying the first row of image data of the first slice; and adjust the display Vsync signal of the source end device until the sixth reference delay is less than a sixth preset threshold.

Persons skilled in the art may understand that division into the foregoing functional modules is merely used as an example for description in the several embodiments provided in this application. The division into the modules or units is merely logical function division, and may be other division in actual implementation. The units (e.g., circuits) described as separate parts may or may not be physically separate, and parts displayed as units may be one or more physical units. In addition, a plurality of units or components may be combined or integrated into another apparatus. In an actual application, an inner structure of an apparatus may be divided into different function modules based on a requirement, to implement all or some of the functions described above.

An embodiment of this application further provides a computer-readable storage medium. The computer-readable storage medium stores instructions, and when the instructions are run on a computer or a processor, the computer or the processor is enabled to perform some or all functions in the method provided in embodiments of this application.

An embodiment of this application further provides a computer program product including instructions. When the instructions are run on a computer or a processor, the computer or the processor is enabled to perform some or all functions of the method provided in embodiments of this application.

It should be understood that, the foregoing embodiments are merely intended for describing the technical solutions of this application, but not for limiting this application.

Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A wireless projection method, wherein the method comprises:
    receiving a bitstream from a source end device, wherein the bitstream is obtained by encoding video data;
    obtaining time information of the bitstream, wherein the time information indicates a first time point at which the source end device starts encoding the bitstream, a second time point at which a destination end device starts receiving the bitstream, a third time point at which the destination end device starts decoding the bitstream, or a fourth time point at which the destination end device completes decoding the bitstream; and
    adjusting a display vertical synchronization (Vsync) signal of the destination end device based on the time information;
    wherein the time information indicates the first time point at which the source end device starts encoding the bitstream; and the obtaining time information of the bitstream comprises:
    extracting the first time point from the bitstream; and
    the adjusting of the display Vsync signal of the destination end device based on the time information comprises:
        obtaining a first reference delay, wherein the first reference delay is a reference delay between the first time point and a time point at which the destination end device completes decoding the bitstream;
        obtaining a first time interval, wherein the first time interval is a delay between the first time point and a time point at which the destination end device starts displaying the video data; and
        adjusting the display Vsync signal of the destination end device until a difference between the first reference delay and the first time interval is less than a first preset threshold.

2. The method according to claim 1, wherein the adjusting of the display Vsync signal of the destination end device until the difference between the first reference delay and the first time interval is less than the first preset threshold comprises:
    when the first time interval is greater than the first reference delay, moving a phase of the display Vsync signal of the destination end device forward by one time step, wherein the time step is a smallest time unit by which a clock of the destination end device can be adjusted;
    when the first time interval is less than the first reference delay, moving the phase of the display Vsync signal of the destination end device backward by one time step; or
    when the difference between the first reference delay and the first time interval is less than the first preset threshold, stopping the adjustment of the display Vsync signal of the destination end device.

3. The method according to claim 1, wherein when the time information indicates the second time point at which the destination end device starts receiving the bitstream, the obtaining time information of the bitstream comprises:

recording the second time point at which the receiving of the bitstream starts; and the adjusting of the display Vsync signal of the destination end device based on the time information comprises:

obtaining a second reference delay, wherein the second reference delay is a reference delay between the second time point and a time point at which the destination end device completes decoding;

obtaining a second time interval, wherein the second time interval is a delay between the second time point and a time point at which the destination end device starts displaying the video data; and adjusting the display Vsync signal of the destination end device until a difference between the second reference delay and the second time interval is less than a second preset threshold.

4. The method according to claim 1, wherein when the time information indicates the third time point at which the destination end device starts decoding the bitstream, the obtaining time information of the bitstream comprises:

obtaining the third time point from a decoder side of the destination end device; and the adjusting of the display Vsync signal of the destination end device based on the time information comprises:

obtaining a third reference delay, wherein the third reference delay is a reference delay between the third time point and a time point at which the destination end device completes decoding the bitstream;

obtaining a third time interval, wherein the third time interval is a delay between the third time point and a time point at which the destination end device starts displaying the video data; and adjusting the display Vsync signal of the destination end device until a difference between the third reference delay and the third time interval is less than a third preset threshold.

5. The method according to claim 1, wherein when the time information indicates the fourth time point at which the destination end device completes decoding the bitstream, the obtaining of the bitstream comprises:

obtaining the fourth time point from a decoder side of the destination end device; and the adjusting of the display Vsync signal of the destination end device based on the time information comprises:

obtaining a fourth reference delay, wherein the fourth reference delay is a reference delay between the fourth time point and a time point at which the destination end device starts displaying the video data; and adjusting the display Vsync signal of the destination end device until the fourth reference delay is less than a fourth preset threshold.

6. The method according to claim 5, wherein the adjusting of the display Vsync signal of the destination end device until the fourth reference delay is less than the fourth preset threshold comprises:

when the fourth reference delay is less than TFrame/2, moving a phase of the display Vsync signal of the destination end device forward by one time step, wherein the time step is a smallest time unit by which a clock of the destination end device can be adjusted, and TFrame is a time interval between two adjacent frames displayed by the destination end device;

when the fourth reference delay is greater than TFrame/2, moving the phase of the display Vsync signal of the destination end device backward by one time step; or when the fourth reference delay is less than the fourth preset threshold, stopping the adjustment of the display Vsync signal of the destination end device.

7. The method according to claim 4, wherein after the receiving of the bitstream from the source end device, the method further comprises:

decoding the bitstream to obtain a first row of image data, wherein the first row of image data is a row of the video data;

when decoding the bitstream data to obtain a second row of image data, sending the first row of image data to a display for display, wherein the time information indicates the third time point at which the destination end device starts decoding the bitstream; and the adjusting of the display of the Vsync signal of the destination end device based on the time information comprises:

obtaining a fifth reference delay, wherein the fifth reference delay is a reference delay between the third time point and a time point at which the destination end device starts displaying the first row of image data; and adjusting the display Vsync signal of the destination end device until the fifth reference delay is less than a fifth preset threshold.

8. The method according to claim 4, wherein the video data is a first slice in a frame of video data, and the time information indicates the third time point at which the destination end device starts decoding the bitstream; and the adjusting of the display of the Vsync signal of the destination end device based on the time information comprises:

obtaining a sixth reference delay, wherein the sixth reference delay is a reference delay between the third time point and a time point at which the destination end device starts displaying the first row of image data of the first slice; and adjusting the display Vsync signal of the destination end device until the sixth reference delay is less than a sixth preset threshold.

9. A wireless projection method, wherein the method comprises:

sending a bitstream to a destination end device, wherein the bitstream is obtained by encoding video data; and adjusting a display vertical synchronization (Vsync) signal of a source end device based on time information, wherein the time information indicates a first time point at which the source end device starts encoding the bitstream, a second time point at which the destination end device starts receiving the bitstream, a third time point at which the destination end device starts decoding the bitstream, or a fourth time point at which the destination end device completes decoding the bitstream, wherein the time information indicates the first time point at which the source end device starts encoding the bitstream, and the method further comprises:

recording the first time point at which encoding of the bitstream starts; and the adjusting of the display Vsync signal of the source end device based on the time information comprises:

obtaining a first reference delay, wherein the first reference delay is a reference delay between the first time point and a time point at which the destination end device completes decoding the bitstream;

obtaining a first time interval, wherein the first time interval is a delay between the first time point and a time point at which the destination end device starts displaying the video data; and adjusting the display Vsync signal of the source end device until a difference between the first reference delay and the first time interval is less than a first preset threshold.

10. The method according to claim 9, wherein the adjusting of the display Vsync signal of the source end device until a difference between the first reference delay and the first time interval is less than a first preset threshold comprises:
when the first time interval is greater than the first reference delay, moving a phase of the display Vsync signal of the source end device backward by one time step, wherein the time step is a smallest time unit by which a clock of the source end device can be adjusted;
when the first time interval is less than the first reference delay, moving the phase of the display Vsync signal of the source end device forward by one time step; or
when the difference between the first reference delay and the first time interval is less than the first preset threshold, stopping the adjustment of the display Vsync signal of the source end device.

11. The method according to claim 9, wherein when the time information indicates the second time point at which the destination end device starts receiving the bitstream,
the adjusting of the display Vsync signal of the source end device based on the time information comprises:
obtaining a second reference delay, wherein the second reference delay is a reference delay between the second time point and a time point at which the destination end device completes decoding;
obtaining a second time interval, wherein the second time interval is a delay between the second time point and a time point at which the destination end device starts displaying the video data; and
adjusting the display Vsync signal of the source end device until a difference between the second reference delay and the second time interval is less than a second preset threshold.

12. The method according to claim 9, wherein when the time information indicates the third time point at which the destination end device starts decoding the bitstream, the adjusting of the display Vsync signal of the source end device based on the time information comprises:
obtaining a third reference delay, wherein the third reference delay is a reference delay between the third time point and a time point at which the destination end device completes decoding the bitstream;
obtaining a third time interval, wherein the third time interval is a delay between the third time point and a time point at which the destination end device starts displaying the video data; and
adjusting the display Vsync signal of the source end device until a difference between the third reference delay and the third time interval is less than a third preset threshold.

13. The method according to claim 9, wherein when the time information indicates the fourth time point at which the destination end device completes decoding the bitstream,
the adjusting of the display Vsync signal of the source end device based on the time information comprises:
obtaining a fourth reference delay, wherein the fourth reference delay is a reference delay between the fourth time point and a time point at which the destination end device starts displaying the video data; and
adjusting the display Vsync signal of the source end device until the fourth reference delay is less than a fourth preset threshold.

14. A non-transitory computer-readable storage medium, wherein the computer-readable storage medium stores instructions, and when the instructions are executed by a processor, the method according to claim 1 is implemented.

15. A computer program that includes instructions stored on a memory, wherein when the instructions are executed by a processor, the method according to claim 1 is implemented.

16. A device that comprises a processor, a memory configured to store a computer program, and a transmission interface configured to receive and send data, wherein when the computer program is executed by the processor, the method according to claim 1 is implemented.

* * * * *